United States Patent [19]

Nishikawa et al.

[11] Patent Number: 5,724,107

[45] Date of Patent: Mar. 3, 1998

[54] LIQUID CRYSTAL DISPLAY WITH TRANSPARENT STORAGE CAPACITORS FOR HOLDING ELECTRIC CHARGES

[75] Inventors: Ryuji Nishikawa; Toshio Shimada, both of Gifu, Japan

[73] Assignee: Sanyo Electric Co., Ltd., Osaka, Japan

[21] Appl. No.: 534,109

[22] Filed: Sep. 26, 1995

[30] Foreign Application Priority Data

| Sep. 30, 1994 | [JP] | Japan | 6-237483 |
| Nov. 30, 1994 | [JP] | Japan | 6-296894 |
| Dec. 9, 1994 | [JP] | Japan | 6-306550 |
| Dec. 9, 1994 | [JP] | Japan | 6-306553 |

[51] Int. Cl.$^6$ ............ G02F 1/1343; G02F 1/1333; G02F 1/1335; G02F 1/13
[52] U.S. Cl. ............ 349/38; 349/110; 349/111; 349/137; 349/187
[58] Field of Search ............ 359/59, 67; 349/38, 349/39, 137, 110, 111, 187

[56] References Cited

U.S. PATENT DOCUMENTS

| 4,563,806 | 1/1986 | Coissard et al. | 437/54 |
| 4,581,619 | 4/1986 | Mizutome et al. | 349/39 |
| 4,687,298 | 8/1987 | Aoki et al. | 359/67 |
| 4,759,610 | 7/1988 | Yanagisawa | 349/38 |
| 4,869,576 | 9/1989 | Aoki et al. | 359/68 |
| 5,161,043 | 11/1992 | Narutaki et al. | 349/111 |
| 5,283,566 | 2/1994 | Mimura et al. | 345/211 |

FOREIGN PATENT DOCUMENTS

| 59-232385 | 12/1984 | Japan . | |
| 60-120321 | 6/1985 | Japan | 359/67 |
| 61-004018 | 1/1986 | Japan | 359/67 |
| 4237027 | 8/1992 | Japan . | |

*Primary Examiner*—William L. Sikes
*Assistant Examiner*—Walter J. Malinowski
*Attorney, Agent, or Firm*—Loeb & Loeb LLP

[57] ABSTRACT

A storage capacitor is constituted by a storage capacitor electrode, made of a transparent and conductive film extending substantially all over a substrate, and pixel electrodes overlapping with the storage capacitor electrode via an interlevel insulation layer. The storage capacitor holds charges. The storage capacitor electrode is positioned such that it faces the entire surface of the pixel electrodes. Since the transparent and conductive storage capacitor electrode does not reduce the aperture ratio, the storage capacitor can have a large capacitance. A signal voltage applied to the storage capacitor electrode is determined so as not to activate the thin film transistors which are not selected. A light-shielding layer is present at a position between pixel electrodes on or under the storage capacitor electrode. The light-shielding layer shields the thin film transistors, gate lines and drain lines from incident light, thereby preventing reduction of contrast of displayed pictures. Further, an anti-reflection layer formed by heat treatment is placed on a boundary between the storage capacitor electrode and the light-shielding layer, and is effective in assuring visibility of the picture on the liquid crystal display.

24 Claims, 12 Drawing Sheets

LIQUID CRYSTAL DISPLAY WITH TRANSPARENT STORAGE CAPACITORS FOR HOLDING ELECTRIC CHARGES

BACKGROUND OF THE INVENTION

1. Field of the Invention

This invention relates to a liquid crystal display, and more particularly to a liquid crystal display which includes a light-shielding layer formed on a TFT substrate so as to improve the aperture ratio.

2. Description of the Prior Art

Liquid crystal displays are advantageous in that they are thin, compact and light, and have low power consumption, and they have been in practical use in the fields of OA equipment, AV equipment and so on. Especially, active matrix type liquid crystal displays using thin film transistors (called "TFT" hereinafter) as switching elements can theoretically drive the static driver at a duty ratio of 100% in a multiplex manner, and are applicable for displaying moving AV images on a large display screen with high resolution.

An active matrix type liquid crystal display displays images comprising transmitted light of each liquid crystal capacitor to which desired voltages are applied. Each of the liquid crystal capacitors comprises a pair of transparent electrodes which face each other with a liquid crystal layer interposed therebetween. Each of the two transparent electrodes is formed on each transparent substrate. One of the two transparent electrodes serves as pixel electrodes arranged in a matrix array, while the other is a common electrode which extends all over the transparent substrate. A plurality of pixel electrodes and the common electrode constitute pixels in the matrix array. The pixel electrodes are respectively connected to their associated TFTs. The TFTs are scanned line by line at a time, and selected such that TFTs on the same gate line are simultaneously ON. In synchronization with this operation, a display data signal is applied to the pixel electrodes via the TFTs. The liquid crystal capacitors associated with respective pixels hold the voltage applied thereto until the data is rewritten in a succeeding field due to OFF resistance of the TFT. Thus, a desired electrical field is formed in a liquid crystal. The liquid crystal layer electrostatically reacts to the electrical field, changes its orientation and its optical characteristics, and modulates passing light. Light modulation is controlled in every pixel such that light passing therethrough is synthesized, thereby displaying an image as desired on the liquid display panel.

When TFTs are of a staggered type having gates placed over a semiconductor layer, a TFT substrate can be manufactured using three masks at a reduced cost. FIG. 1 of the accompanying drawings shows a structure of such a conventional liquid crystal display. In this liquid crystal display, a black matrix made of a light-shielding layer, which increases the contrast ratio by shielding non-modulated light between pixels, is formed on a TFT substrate. FIG. 2 is a cross section of the liquid crystal display, taken along line 1X–1X' shown in FIG. 1. The following elements are stacked on the substrate 10 in the following order: a scan signal gate line 17L and a data signal drain line 14L which intersect with each other; a pixel electrode 14P in an area defined by the gate and drain lines 17L and 14L; a light-shielding layer 11 near an intersection of the gate and drains lines 17L and 14L; an insulation layer 13; a source electrode 14S and a drain electrode 14D; an a-Si layer 15; a gate insulating layer 16; and a gate electrode 17G. A storage capacitor electrode 12 is present along a periphery of the pixel electrode 14P, and overlaps with the pixel electrode 14P on the substrate 10 with the insulation layer 13 sandwiched therebetween, thereby forming a storage capacitor.

The substrate 20, which is opposite the foregoing TFT substrate and is called "opposing substrate 20", includes a light-shielding layer 21 made of a material such as Cr. The light-shielding layer 21 is shaped so as not to shield the display region, i.e., an aperture. A common electrode 22 made of ITO entirely covers the opposing substrate 20. Further, a polyimide orientation layer 23 covers the upper surface of the common electrode 22. A liquid crystal layer 30 is present between the TFT substrate 10 and the opposing substrate 20.

This liquid crystal display is characterized by the storage capacitor electrode 12, which functions not only as the storage capacitor but also as a light-shielding layer covering the periphery of the pixel electrode 14P. The storage capacitor electrode 12 as the black matrix improves the aperture ratio of the liquid crystal display. If the black matrix is formed on the opposing substrate 20 where the common electrode is present, the substrates 10 and 20 may be aligned with a relatively large positional difference therebetween. In such a case, the black matrix should have a alignment margin of 5 µm to 10 µm so as to prevent nonmodulated light from leaking around the pixel electrode. This means that the liquid crystal display has a reduced effective display area and a reduced aperture ratio. Conversely, if the black matrix is present on the TFT substrate 10 as shown in FIGS. 1 and 2, the alignment margin can be reduced by 2 µm to 3 µm, thereby improving the aperture ratio.

The storage capacitor electrode 12 is made of a light-shielding material such as Cr, similarly to the light-shielding layer 11 which shields light incident into a channel area of the TFT via a rear surface of the TFT substrate 10. Both the light-shielding layer 11 and the storage capacitor 12 are entirely covered by the insulation layer 13 made of a material such as SiNX. The pixel electrode 14P and the drain line 14L are made of a material such as ITO, and are partially adjacent to each other, thereby forming the TFT source electrode 14S and the drain electrode 14D. The a-Si layer 15 serves as a channel layer. The a-Si layer 15 and the gate insulating layer 16 of the TFT are also formed under the gate line 17L. The gate line 17L and the gate electrode 17G are integral, and are patterned similarly to the a-Si layer 15 and gate insulating layer 16. Further, an $N^+$-a-Si layer 15N, to which impurity ions such as phosphorus are doped so as to reduce the resistance, is interposed between the a-Si layer 15 and the drain electrode 14D, thereby improving an ohmic characteristic. A polyimide orientation layer 18 covers the TFT, lines and electrodes so as to control the orientation of liquid crystal molecules. The layer 18 is surface-treated by rubbing.

Each of the TFTs shown in FIGS. 1 and 2 has the non-transparent storage capacitor electrode 12 disposed along the periphery of the pixel electrode 14P so as not to reduce the display area. This structure is effective in allowing a larger display area by arranging the black matrix and the storage capacitor electrode 12 of the light-shielding type such that they occupy the same area. Thus, it is possible to keep the display area as large as possible and improve the aperture ratio. For instance, the storage capacitor on the TFT substrate is effective in allowing a larger display area and can have a certain capacitance, compared with a case in which the light-shielding layer is present on the opposing substrate 20.

With the foregoing structures, it is substantially impossible to increase the capacitance of the storage capacitor when the storage capacitor electrode 12 is maintained minimum so as to provide the necessary alignment margin with the light-shielding layer 21 on the opposing substrate. Further, the display area has to be reduced if the storage capacitor electrode 12 is to be made large enough to maintain the predetermined capacitance. With the prior art, it is impossible to drastically increase the aperture ratio and increase the capacitance of the storage capacitor simultaneously.

In the case of a projection TV, it is necessary to increase the aperture ratio of the liquid crystal display as much as possible so as to display an image having high brightness and to prevent a leakage current due to an OFF resistance of the TFT lowered by strong incident light. Further, it is required to maintain the voltage holding characteristics by increasing the capacitance of the storage capacitor. Therefore, conventional liquid crystal displays have problems in that they have difficulty meeting the foregoing requirements.

SUMMARY OF THE INVENTION

The invention is aimed at providing a liquid crystal display which improves the aperture ratio, increases the storage capacitance, and produces good images.

To accomplish the foregoing objectives, the liquid crystal display of the invention features storage capacitors for holding charges. According to a first aspect of the invention, a first substrate carries thereon: a plurality of pixel electrodes arranged in a matrix array; drain lines formed between columns of the pixel electrodes; gate lines formed between rows of the pixel electrodes; thin film transistors, each thin film transistor having a source electrode connected to each pixel electrode, a drain electrode connected to each drain line, and a gate electrode connected to each gate line; a first light-shielding layer shielding light between the pixel electrodes; storage capacitor electrodes being opposed to the pixel electrodes via an insulation layer and being made of a transparent conductive layer applied substantially all over the first substrate; and storage capacitors holding charges, the storage capacitors being formed in an area where the pixel electrodes and the storage capacitor electrodes are opposed to one another.

The second substrate includes a common electrode extending substantially all over the area where the first and second substrates face each other.

In this arrangement, the storage capacitor electrode is constituted by a transparent conductive film laid substantially all over the first substrate. In other words, the storage capacitor electrode is opposed to the entire surface of the pixel electrode, thereby providing the storage capacitors with a large capacitance. The transparent storage capacitor electrode does not affect an aperture ratio. Further, the light-shielding layers present between the pixel electrodes shield the thin film transistors, gate lines and drain lines from a light source or ambient light, which is effective in reliably preventing reduction in contrast of displayed images.

The first light-shielding layer on the first substrate can minimize the margin for assembling the first and second substrate, and can increase the aperture ratio.

The second substrate further includes a second light-shielding layer present at a position corresponding to the first light-shielding layer, and the second light-shielding layer has an aperture which is larger than the aperture of the first light-shielding layer. Therefore, even if the first and second substrates are bound with some positional deviations therebetween, the aperture ratio can be maintained as desired. Further, light incident onto the liquid crystal layer diverges therein due to diffraction and passes therethrough. Therefore, light arriving via the aperture of the first substrate can be effectively guided out via the aperture on the second substrate. Light can be effectively utilized, thereby increasing the brightness.

The storage capacitor electrode extends substantially all over the first substrate other than the peripheral edge thereof. If a large substrate is formed with various conductive layers and is cut into pieces to obtain a plurality of the first substrates, each storage capacitor electrode can be prevented from being exposed from the peripheral edge of the first substrate. Thus, it is possible to prevent shorting of the driving circuit element of the liquid crystal display and the storage capacitor electrode, and to prevent static electricity from reaching the display area of the liquid crystal display via the storage capacitor electrode.

The first light-shielding layer is formed either on or under the storage capacitor electrodes. The storage capacitor electrodes are made of an oxide alloy of indium and tin, the first light-shielding layer is made of chromium, and an antireflection layer made of chromium oxide is formed on the boundary between the first light-shielding layer and the storage capacitor electrodes.

If the chromium light-shielding layer having a large reflectance were positioned near a viewer's side, ambient light incident onto the liquid crystal display would be reflected by the first light-shielding layer, which would make images less visible. To overcome this problem, an antireflection layer having a low reflection is formed on the chromium light-shielding layer and is positioned near the viewer's side. This improves the visibility of the images.

The anti-reflection layer is formed by heat treatment after formation of the storage capacitor electrodes and the first light-shielding layer.

Next, the voltage of the storage capacitor signal applied to the storage capacitor electrode is determined such that when thin film transistors are not selected, the difference between both potentials of the drain and source electrodes of the thin film transistors and the potential of the storage capacitor electrode is smaller than the operating voltage threshold of the thin film transistors.

The voltage of the storage capacitor electrode signal is level-shifted from the voltage of the common electrode signal applied to the common electrode.

Even when the storage capacitor electrodes extending substantially all over the first substrate are operated by the foregoing signal, the voltage applied to the storage capacitor electrode prevents generation of a leakage current caused by operation of non-selected thin film transistors. Therefore, it is possible to prevent poor picture quality due to the reduced holding voltage of thin film transistors during a non-selected period.

The storage capacitor signal can be made by shifting the voltage level of the common electrode signal in a simplified circuit. Further, the common electrode and the storage capacitor electrode have different potentials. Therefore, there is a potential difference between these electrodes even if they are shorted making some pixels defective. In this state, it is possible to drive the liquid crystal to a certain extent. Thus, it is possible to make such defective pixels less distinguishable.

The liquid crystal display is further characterized in that: an insulation layer and a semiconductor layer are formed under the gate lines; each source electrode is constituted by a part of each pixel electrode; each drain electrode is constituted by a part of each drain line; a channel layer which is a part of the semiconductor layer is positioned at an area where the source electrode and the drain electrode lie adjacent to each other; a gate insulation layer which is a part of the insulation layer extends over the channel layer; and each gate electrode is constituted by a part of each gate line and is positioned on the gate insulation layer.

The storage capacitor electrode extends to the vicinity of the peripheral edge of the first substrate, and lies opposed to an input terminal electrode via the insulation layer, and a desired signal applied to the input terminal electrode is capable of controlling charges of the storage capacitor.

The foregoing arrangement enables the various layers on the first substrate to be patterned using three masks and three photoetching processes, which can reduce the manufacturing cost.

BRIEF DESCRIPTION OF THE DRAWINGS

The invention will be described in greater detail with reference to the accompanying drawings, wherein.

BRIEF DESCRIPTION OF THE PREFERRED EMBODIMENTS

Embodiment 1:

The invention will be described with reference to a first embodiment shown in FIGS. 3 and 4. Identical members have identical reference numbers, and will not be repeatedly described in detail.

Figure 1:
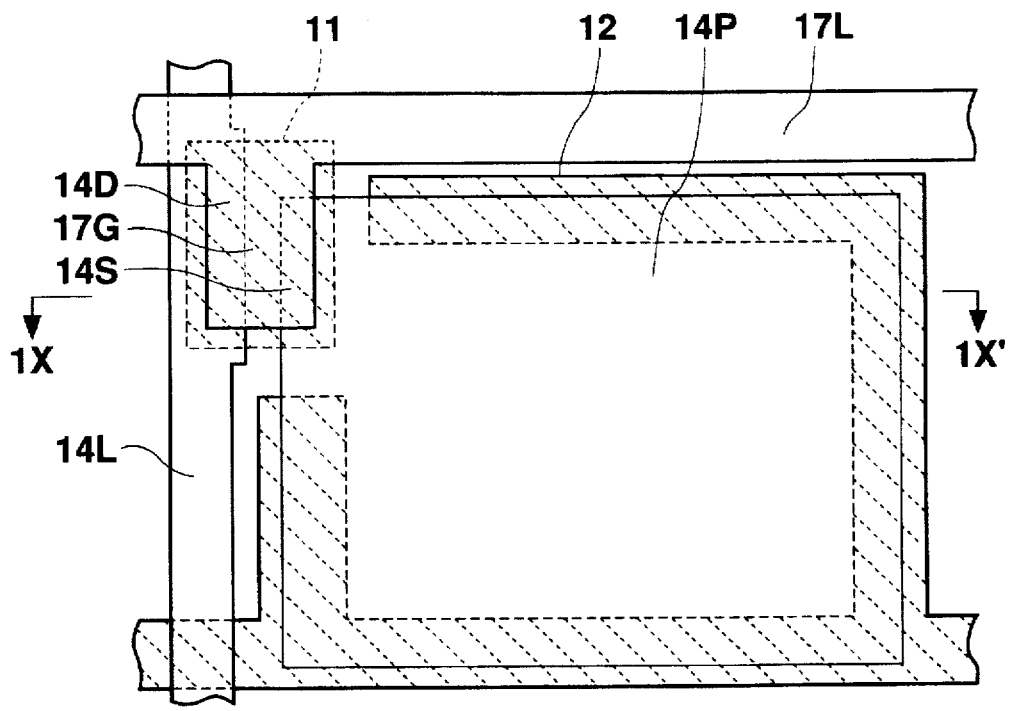
FIG. 1 is a schematic view showing the configuration of a TFT substrate used in a conventional liquid crystal display.
Figure 2:
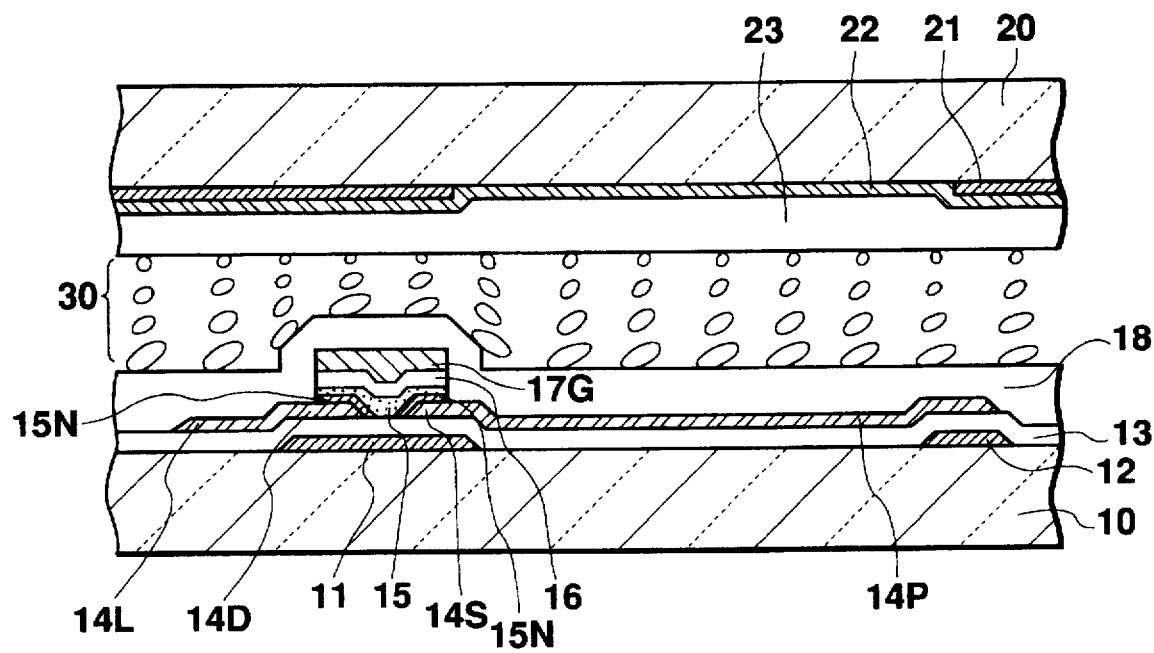
FIG. 2 is a cross section of the liquid crystal display, taken along line 1X–1X' shown in FIG. 1.
Figure 3:
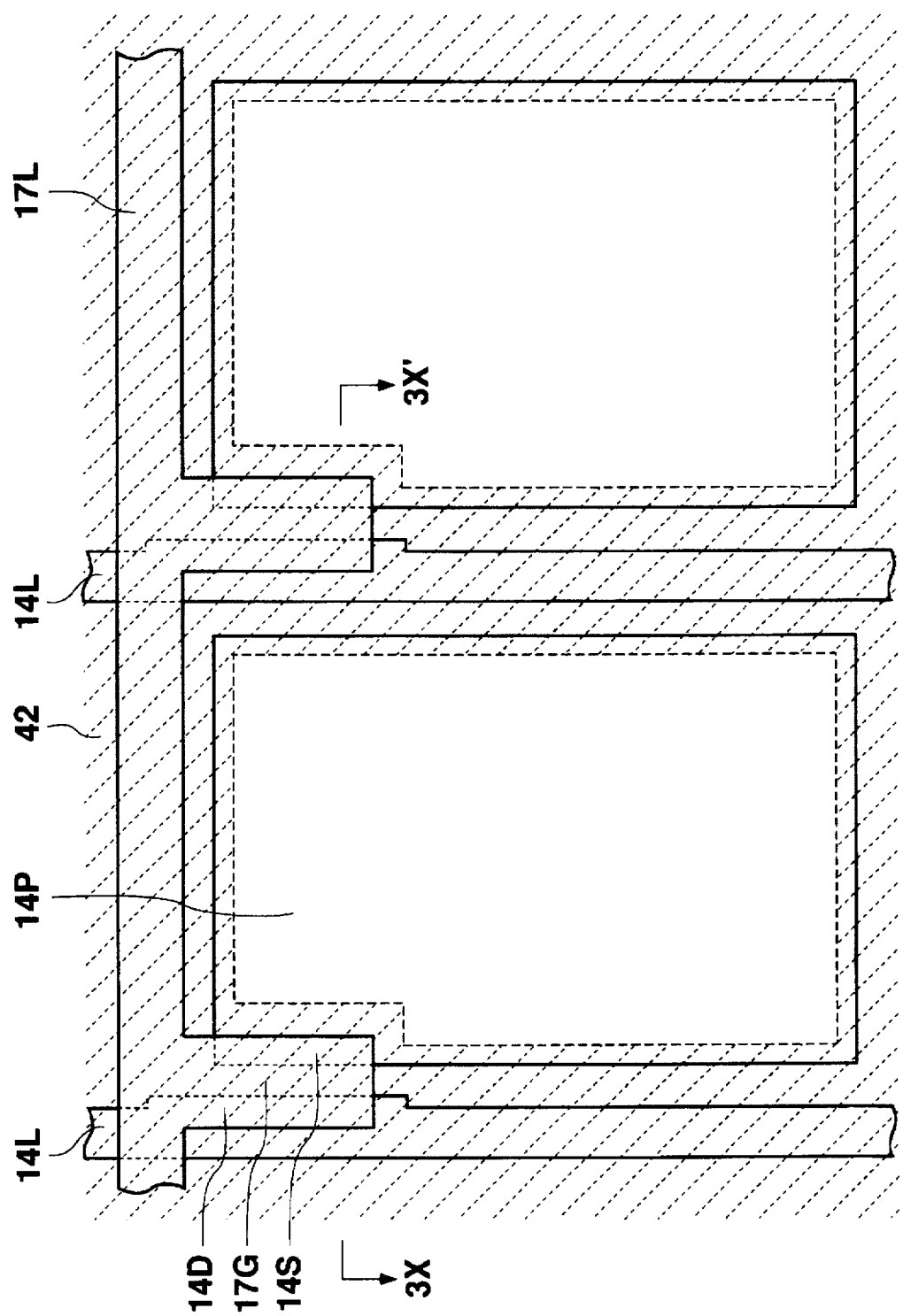
FIG. 3 is a schematic view showing the configuration of a TFT substrate used in a liquid crystal display according to a first embodiment of the invention.

FIG. 3 is a plan view of a TFT substrate for the liquid crystal display according to the present invention. FIG. 4 is a cross section the TFT substrate taken along line 3X–3X' shown in FIG. 3.

The TFT substrate comprises the following elements, which are formed on a transparent substrate 10 in the following order: a storage capacitor electrode 40 made of a transparent conductive material; a light-shielding layer 42 (also functioning as a black matrix); an insulation layer 13; a gate line 17L, a drain line 14L, a TFT, and a pixel electrode 14P connected to the TFT.

The storage capacitor electrode 40 extends over the entire surface of the TFT substrate 10. The pixel electrode 14P is present in an area defined by the gate line 17L and the drain line 14L, and is over the storage capacitor electrode 40 via the insulation layer 13. Thus, the pixel electrode 14P and the storage capacitor electrode 40 constitute a storage capacitor. The light-shielding layer 42 is made of a material such as Cr, and overlaps with the periphery of the pixel electrode 14P. In this embodiment, the light-shielding layer 42 extends all over the TFT substrate 10, excluding the aperture, i.e., to the undersides of the gate line 17L and the drain line 14L. The light-shielding layer 42 also extends to a lower part of the TFT so as to shield the channel area thereof.

In a display area of the liquid crystal display, an opposing substrate 48 faces the TFT substrate 46 with a liquid crystal layer 30 sandwiched therebetween. The opposing substrate 48 has a transparent substrate 20 similar to that of the conventional example, a light-shielding layer 21 on the transparent substrate 20, and a common electrode 22 covering the light-shielding layer 21. The common electrode 22 is made of a transparent conductive material. The light-shielding layer 21 is smaller than the light-shielding layer 42 of the substrate 10. In other words, the aperture of the opposing substrate 48 is larger than the aperture of the substrate 10.

The light-shielding layer 42 (also functioning as the black matrix) of the TFT substrate 46 is effective in increasing the aperture ratio. During photoetching, the pixel electrode 14P and the light-shielding layer 42 are precisely aligned with the substrate 10 using a mask, so the pixel electrode 14P and the light-shielding layer 42 are mutually aligned with a minimum deviation therebetween. Thus, it is possible to minimize margins of the pixel electrode 14P and the light-shielding layer 42. Further, it is possible to minimize the area where the pixel electrode 14P and the light-shielding layer 42 overlap each other, thereby improving the aperture ratio of the liquid crystal display.

The storage capacitor electrode 40 made of a transparent conductive material such as ITO extends all over the substrate 10. Thus, the storage capacitor is as large as the pixel electrode 14P. Thus, the storage capacitor has a large capacitance. Further, since the storage capacitor electrode is not made of a light-shielding material, in contrast to the prior art, and since the display area is not narrowed by the storage capacitor electrode 40, the aperture ratio can be improved.

The transparent and conductive storage capacitor electrode 40 is independent from the light-shielding layer 42, and is effective in improving the aperture ratio in the structure in which the black matrix is on the TFT substrate 46. If the aligning margin is narrowed in the conventional examples, and the storage capacitor electrode overlaps with the pixel electrode 14P to a reduced extent, the capacitance of the storage capacitor will be reduced. However, in this embodiment, the transparent storage capacitor electrode 40 and the light-shielding layer 42 are separately formed on the substrate 10. Thus, it is possible not only to improve the aperture ratio but also to increase the capacitance of the storage capacitor.

A staggered TFT structure is suitable for the liquid crystal display having the storage capacitor electrode 40. In this structure, gate lines for the TFTs are positioned above a semiconductor layer. When the TFTs are arranged in a reversed stagger, the storage capacitor electrode, light-shielding layer, interlevel insulation layer, gate electrode, gate insulating layer, semiconductor layer, and source and drain electrodes are stacked on the substrate in the named order. This reversed stagger structure is prone to the following problem. Assume that the gate line and the gate electrode are integral. In such a case, since this gate layer is below the pixel electrode, there is caused a parasitic capacitance between the gate layer and the storage capacitor electrode, which would distort a gate signal for selecting TFTs. The distorted gate signal directly affects the switching operation of the TFTs. If the interlevel insulation layer is thickened so as to minimize the parasitic capacitance and to overcome the distortion of the gate signal, a dielectric layer of the storage capacitor comprising the interlevel insulation and gate insulation layer is remarkably thickened, which would reduce the storage capacitance. As a result, the advantage of forming the transparent storage capacitor electrode 40 all over the substrate 10 would be lost. On the other hand, if the gate insulation layer were patterned so as to be present only on the TFTs, the storage capacitance could be increased because of the absence of the gate insulation layer. In this case, the number of masks for the manufacturing process will be increased, and the manufacturing cost will be raised. Further, there would be a large difference of height between the TFT and the pixel electrode, which would cause the orientation layer 18 to have an uneven surface. This uneven surface of the orientation layer 18 would disturb the orientation of the liquid crystal, which would lead to a reverse tilt domain or disclination.

This embodiment is characterized in that the light-shielding layer 42 made of a low resistance material like Cr is present on the storage capacitor electrode 40 of a relatively high resistance material such as ITO. This not only compensates for the high resistance of ITO but also prevents worsening of charging characteristics of the storage capacitor. Further, the storage capacitor electrode 40 does not cover an edge of the light-shielding layer 42, thereby preventing the storage capacitor electrode 40 from being broken.

Figure 5:
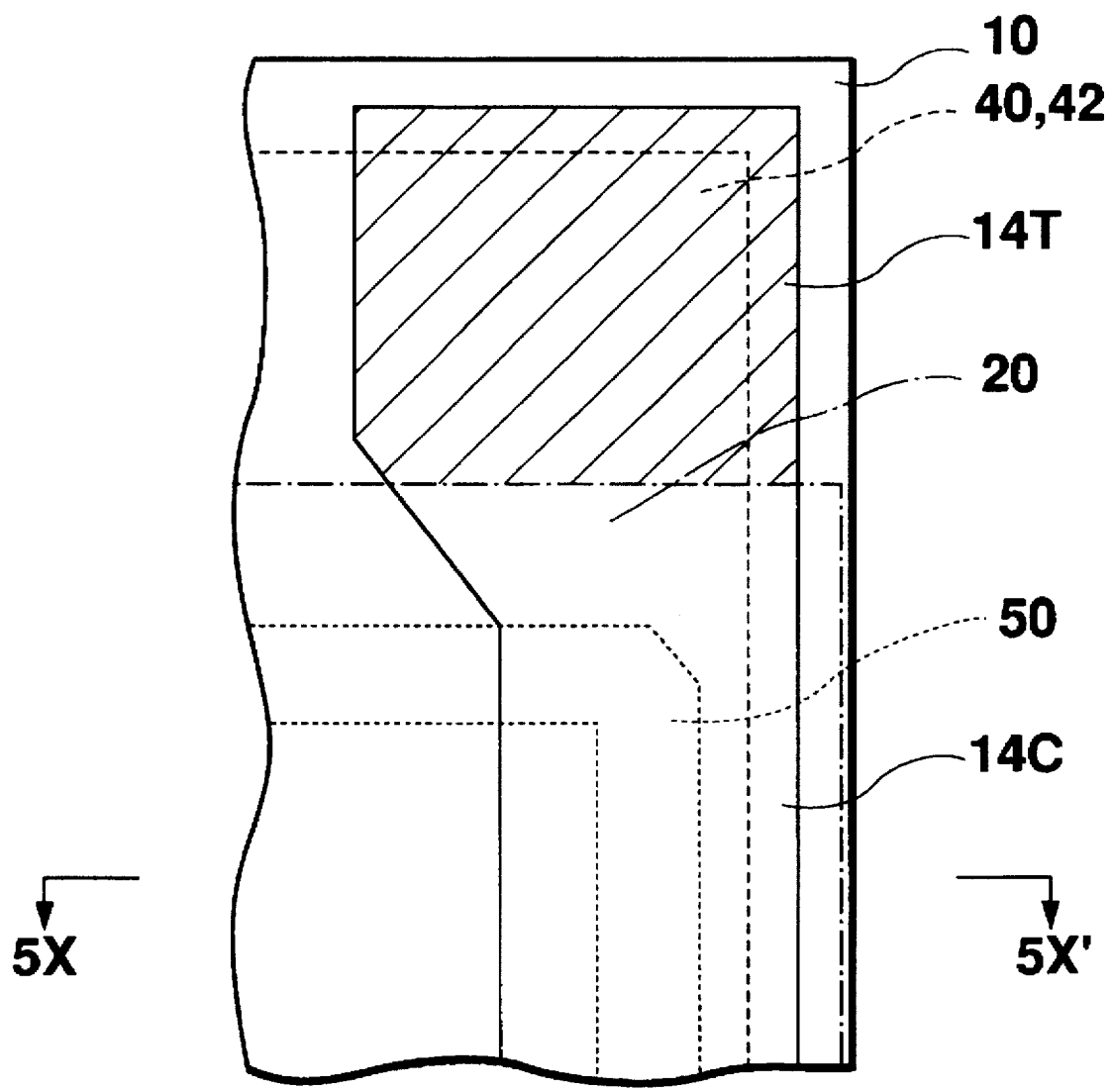
FIG. 5 is a schematic view showing the configuration of one end of the TFT substrate shown in FIG. 3.
Figure 6:
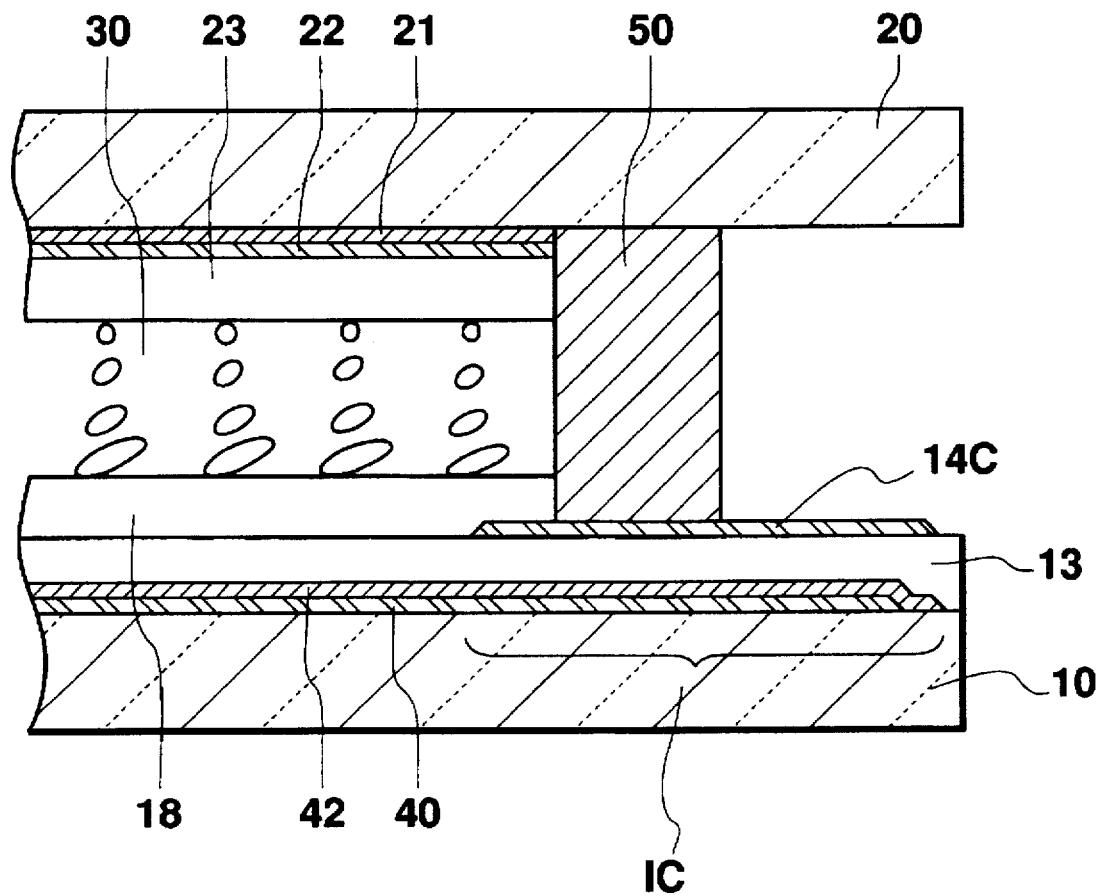
FIG. 6 is a cross section of the liquid crystal display, take along line 5X–5X' shown in FIG. 5.

Referring to FIGS. 5 and 6, a description will be made of the configuration of one end of the substrates 10 and 20. FIG. 5 shows the configuration of an input terminal electrode 14C which is located at one end of the TFT substrate 46 and functions to transmit a signal to the storage capacitor electrode 40. FIG. 6 is a cross section of the liquid crystal display, particularly a signal input section, taken along line 5X–5X' in FIG. 5.

Similarly to the display section, the storage capacitor electrode 40, the light-shielding layer 42 and the interlevel insulation layer 13 are formed on the substrate 10 in this order. The input terminal electrode 14C is present near the periphery of the substrate 10 with the interlevel insulation layer 13 sandwiched therebetween. As shown in FIG. 5, one end of the input terminal electrode 14C, i.e., the shaded portion, serves as an input terminal 14T to which a common electrode signal is applied, for example. A plurality of input capacitors IC are formed at an area where the input terminal electrode 14C faces the storage capacitor electrode 40. The input capacitors IC are commonly connected in series with the storage capacitor which is constituted by the electrically floating storage capacitor electrode 40 and respective pixel electrode 14P.

Since the storage capacitor electrode 40 remains electrically floating, its total charge is zero. Therefore, when a signal voltage to the common electrode 22 is also applied to the input terminal electrode 14C via the input terminal 14T, the storage capacitor electrode 40 is polarized electrically into the input capacitor IC portion and the storage capacitor SC portion, and charges appear in the input capacitor IC portion of the storage capacitor electrode 40, and charges having a polarity opposite to that of the foregoing charges appear in the storage capacitor SC portion of the storage capacitor electrode 40. Thus, the storage capacitor electrode 40 provides each pixel electrode with a voltage in accordance with the voltage applied to the input terminal electrode 14C. Therefore, it is possible to appropriately control the voltage of the storage capacitor electrode 40 without making contact holes by the photoetching process, and actuate the storage capacitors of the respective pixels.

In the first embodiment, the opposing substrate 48 also includes the light-shielding layer 21 so as to utilize light effectively. Specifically, light passing between the light-shielding layers 42 of the TFT substrate 46, is diffracted and scattered onto the non-display area. Light is not modulated in the non-display area where there is no electrical field, therefore, lowering the contrast of the image. To overcome this problem, it is conceivable to considerably downsize the aperture compared with the pixel electrode area so as to shield the non-modulated light. However, such a measure would strikingly reduce the aperture ratio. In this embodiment, not only the light-shielding layer 42 extends over the TFT substrate 46, other than the display area, but also the light-shielding layer 21, which is narrower than the light-shielding layer 42, extends over the opposing substrate 48 at an area corresponding to the light-shielding layer 42. The diffracted light is reflected between the foregoing light-shielding layers 42 and 21 such that it is guided to the display area, is modulated there and goes out via the aperture.

The electrical field present in the liquid crystal layer 30 is distributed in the shape of a fan out of the display electrode 14P toward the common electrode 22. Thus, the aperture of the opposing substrate 48 is larger than the aperture of the TFT substrate 46 such that light having small diffraction angles can pass through the space between the light-shielding layers 42 and 21 and such that only light having large diffraction angles can be shielded and reflected. In this respect, the first embodiment is effective in utilizing light.

The foregoing liquid crystal display is manufactured as described below. First of all, a metal mask of several 100 μm in width covers the peripheral ends of the transparent glass substrate 10. ITO is sputtered onto the substrate 10, thereby being deposited approximately 500 to 1000 Å thick as the storage capacitor electrode 40, which extends substantially all over the substrate 10. Generally, a large substrate is manufactured first, and is cut into pieces (a TFT array substrate), in the final stage of the manufacturing process, so as to obtain a plurality of LCD panels (TFT array substrates). The metal mask is applied onto the substrate 10 such that no storage capacitor electrode 40 is formed along the peripheral ends of the substrate 10 and that the storage capacitor electrode 40 is not exposed at cut portions. In other words, the storage capacitor electrode 40 does not extend to an area of the TFT substrate 46 where it is cut, and is prevented from being exposed to the side edges of the LCD panel. Therefore, it is possible to prevent the storage capacitor electrode 40 from coming into contact with a TAB (tape automated bonding) and being shorted, and to prevent application of static electricity to the display area of the LCD. Since it is not necessary to align the storage capacitor electrode 40 with the substrate 10 so precisely, the storage capacitor electrode 40 can be patterned using the metal mask.

Cr is sputtered onto the substrate 10 and is deposited approximately 2000 Å thick. The substrate 10 is then patterned by the photoetching process, so an aperture is formed at the predetermined display area, and the area other than the aperture is covered by the light-shielding layer 42 made of Cr. Thereafter, $SiO_2$ is deposited 7000 to 10000 Å thick on the substrate 10 by the CVD process, thereby forming the interlevel insulation layer 13 all over the substrate 10 so as to cover the storage capacitor electrode 40 and the light-shielding layer 42. Since the storage capacitor electrode 40 is present under the pixel electrode 14P, it is possible to provide a large capacitance. Therefore, the interlevel insulation layer 13 can be relatively thickened so as to prevent the other lines from being adversely affected by the storage capacitor electrode 40. In other words, the parasitic capacitance caused between the light-shielding layer 42 and the drain line 14L, and that caused between the light-shielding layer 42 and the gate line 17L, can be reduced, thereby preventing distortion of the display data signal and the gate signal. Further, it is possible to prevent the TFTs from malfunctioning due to a voltage applied to the storage capacitor electrode 40 or the light-shielding layer 42 connected to the storage capacitor electrode 40.

ITO is sputtered approximately 1000 Å thick onto the interlevel insulation layer 13. The ITO layer is patterned by the photoetching process, thereby simultaneously forming the following layers: (i) the pixel electrode 14P overlapping with the light-shielding layer 42 with its peripheral edge in 2 to 3 μm width via the interlevel insulation layer 13; (ii) the drain line 14L present between columns of the pixel electrodes 14P and the source electrode 14S integral with the pixel electrode 14P; (iii) the drain electrode 14D integral with the drain line 14L; and (iv) the input terminal electrode 14C at least at one end of the substrate 10. When sputtering ITO, an ITO target added with Group V element such as phosphorus is used. Thus, the lines and electrodes 14L, 14P, 14S, 14D and 14C contain the Group V element.

The a-Si layer 15 is deposited 500 to 1000 Å thick on the substrate 10, having the drain line 14L and so on thereon, using the plasma CVD process. Thereafter, $SiN_x$ is deposited at a thickness of 2000 to 4000 Å using the plasma CVD process, thereby forming the gate insulating layer 16. Then, Al is deposited at a thickness of approximately 4000 Å on the substrate by the sputtering process, thereby forming the gate line 17L. While forming the a-Si layer 15, a material such as phosphorus contained in the ITO layer is diffused into the a-Si layer 15, so an $N^+$-a-Si layer 15N will be formed at the boundary between the ITO layer and the a-Si layer. The $N^+$-a-Si layer 15N may be separately formed by the CVD process. In such a case, the lower ITO layer is not required to contain the Group V element. Unnecessary portions of the Al, $SiN_x$, a-Si and $N^+$-a-Si layers will be removed by the etching process using the same mask. Thus, the $N^+$-a-Si layer 15N, a-Si layer 15, gate insulating layer 16 and gate electrode 17G, all of which have the same pattern, are stacked on the source and drain electrodes 14S and 14D, respectively, thereby forming the TFT. The a-Si layer 15 and $SiN_x$ layer 16 are under the gate line 17L made of Al. All of these members have the same pattern. Further the orientation layer 18 made of polyimide is formed on these layers, thereby completing the TFT substrate 46.

The light-shielding layer 21 made of Cr is formed as the black matrix on the opposing transparent substrate 20. The light-shielding layer 21 has an aperture which corresponds to the aperture of the TFT substrate 46 and is 10 μm larger than the latter aperture. The ITO common electrode 22 entirely covers the light-shielding layer 21. Finally, the orientation layer 23 of polyimide is formed over the common electrode 22, thereby completing the opposing substrate 48.

The TFT substrate 46 and the opposing substrate 48 are bonded by a sealant 50 (FIGS. 5 and 6) so as to face each other. The liquid crystal 30 is filled into the space between these substrates 46 and 48, thereby completing one liquid crystal display. According to the first embodiment, only three masks are necessary to manufacture the TFT substrate, which means reduced manufacturing cost.

In summary, the liquid crystal display which can be manufactured using only three masks can not only increase the aperture ratio but also the capacitance of the storage capacitor. Such a liquid crystal display can produce high quality pictures.

Figure 7:
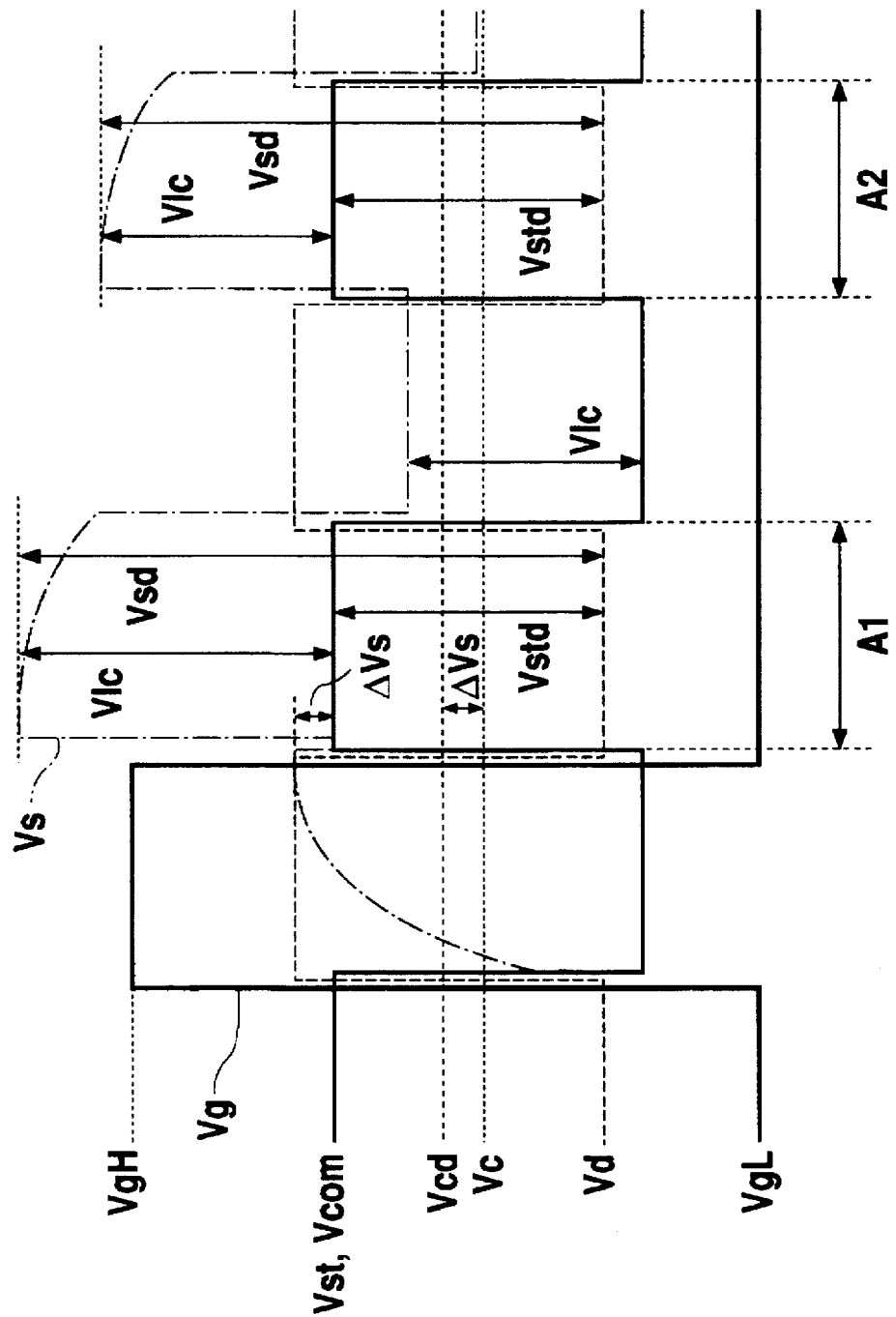
FIG. 7 shows conventional waveforms of voltages applied to drive the liquid crystal display.

The liquid crystal display of the first embodiment is usable in conjunction with a projection TV, provides high brightness pictures, and displays appropriate images without reducing the voltage holding characteristics of each pixel even when a strong light is incident onto the display The liquid crystal display of the invention will be driven as described hereinafter. FIG. 7 shows conventional waveforms of voltages which are used to drive the liquid crystal display particularly showing the waveforms in even-numbered fields. In FIG. 7, Vg denotes a gate voltage, Vd a drain voltage, Vs a source voltage, Vcom a common electrode voltage, and Vst a storage capacitor electrode voltage. When the gate voltage rises to VgH, a TFT becomes ON. A level of the source voltage Vs becomes equal to that of the drain voltage Vd. Conversely, when the gate voltage Vg falls to VgL, the TFT becomes OFF, and holds a charge. The source voltage Vs is affected by the fall of the gate voltage Vg at a parasitic capacitor between the gate and source, and is shifted down by ΔVs. Thus, a central voltage level Vc of the common electrode voltage Vcom is shifted down by ΔVs from a central voltage level Vcd, i.e., a sign changing level of the drain voltage Vd. This operation method is a line at a time reversing drive, in which the sign of the common electrode voltage Vcom is reversed in each scanning cycle. The period during which the gate voltage Vg is VgL is a holding period of a voltage Vlc applied to the liquid crystal capacitor. The source voltage Vs varies with the reversal of the common electrode voltage Vcom. The holding voltage Vlc applied to the liquid crystal capacitors of respective pixels is maintained at a constant level. The sign of the drain voltage Vd is reversed in each scanning cycle. The rising (falling) of the drain voltage Vd is opposite to the rising (falling) of the common electrode voltage Vcom. The signs of the drain voltage Vd and the common electrode voltage Vcom are reversed in every field. The sign of an electrical field applied to the liquid crystal layer 30 is reversed in every field. Therefore, a DC voltage is not applied to the liquid crystal layer 30 so as to prevent changing quality of the liquid crystal. A storage capacitor electrode voltage Vst is equalized to the common electrode voltage Vcom.

Figure 8:
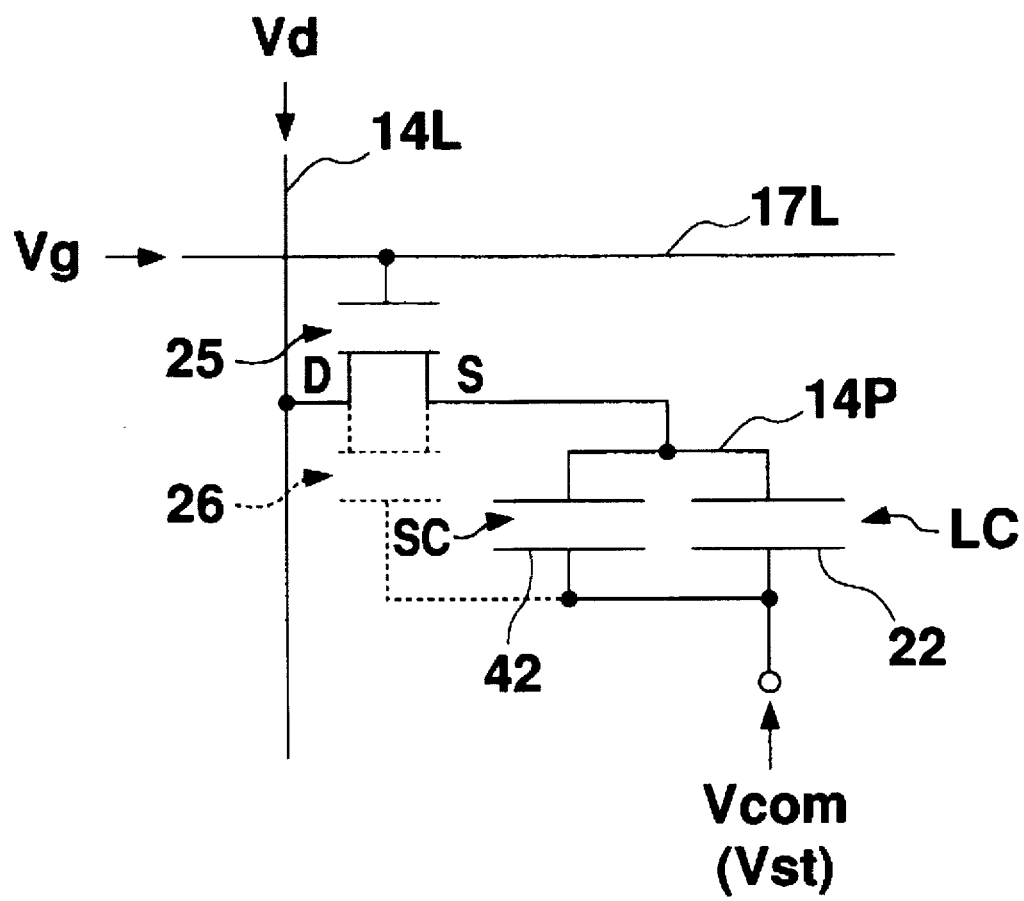
FIG. 8 shows an equivalent circuit of the conventional liquid crystal display.

FIG. 8 shows an equivalent circuit of the liquid crystal display. The gate line 17L receiving the gate voltage Vg and the drain line 14L receiving the drain voltage Vd are arranged so as to intersect each other. Each TFT 25 is positioned near an intersection of the gate and drain lines 17L and 14L, respectively. The source electrode of the TFT 25 is connected to the pixel electrode 14P, which functions as one of two electrodes of the liquid crystal capacitor and as one of two electrodes of the storage capacitor SC. The other electrodes of the liquid crystal capacitor LC and the storage capacitor SC are the common electrode 22 and the storage capacitor electrode 40, respectively. These electrodes 22 and 40 respectively receive the common electrode voltage Vcom and the storage capacitor voltage Vst, which are of the same level.

However, when the storage capacitor electrode 40 extends all over the substrate 10 (FIG. 4), it functions as a gate electrode, thereby causing a parasitic TFT 26. A leakage current is generated between the source and drain of the TFT due to the field effect of the storage capacitor electrode 40, which reduces the charge holding characteristic of the liquid crystal capacitor LC of each pixel, and also reduces the contrast ratio. In the case of line at a time reversing drive method as shown in FIG. 7, while the sign of the drain voltage Vd is negative and the sign of the common electrode voltage Vcom is positive (i.e., periods A1, A2, . . . ), the source voltage Vs, which is charged positive during the application of the gate voltage VgH, is further heightened by the positive level common electrode voltage Vcom. Thus, during these periods, not only a voltage Vsd between the source and drain becomes larger, but also a potential difference Vstd of the storage capacitor electrode voltage Vst to drain voltage Vd becomes larger and positive. Therefore, when the potential difference Vstd exceeds the operating level of the parasitic TFT 26 (FIG. 8), the parasitic TFT 26 becomes active, thereby causing a leakage current to flow between the source and the drain for one field period, whenever above periods A1, A2, . . . pass, the level of the source voltage Vs shifts toward the level of the drain voltage Vd, and the voltage Vlc held in the liquid crystal capacitor is reduced.

In an odd-numbered field where the signs of the voltage levels are opposite to the waveforms shown in FIG. 7 (for the even-numbered fields), the parasitic TFT 26 will become active, causing a leakage current and changing the source voltage Vs. When the source voltage Vs is kept negative while the drain voltage Vd is positive and the common electrode voltage Vcom is negative, the source voltage Vs is further lowered because of the negative level of the common electrode voltage Vcom, the potential difference Vsd between the drain and source voltage is increased, and the potential difference Vsts (not shown) between the storage capacitor electrode voltage Vst and source voltage Vs becomes positive.

The period of time in which the leakage current is present is approximately one half of the total voltage holding period of the TFT. The above stated shift of the source voltage Vs happens very often for a variety of picture data signal to be displayed, which remarkably reduces the voltage holding ratio and the contrast ratio. Especially, at the center of the display area, light from the light source and ambient light tend to reach the semiconductor layer 15 serving as the channel area of the TFT. This reduces the resistance of the TFT, causes a leakage current, and reduces the quality of pictures, i.e., black or white colors are not clearly distinguished, and the display becomes gray.

Figure 4:
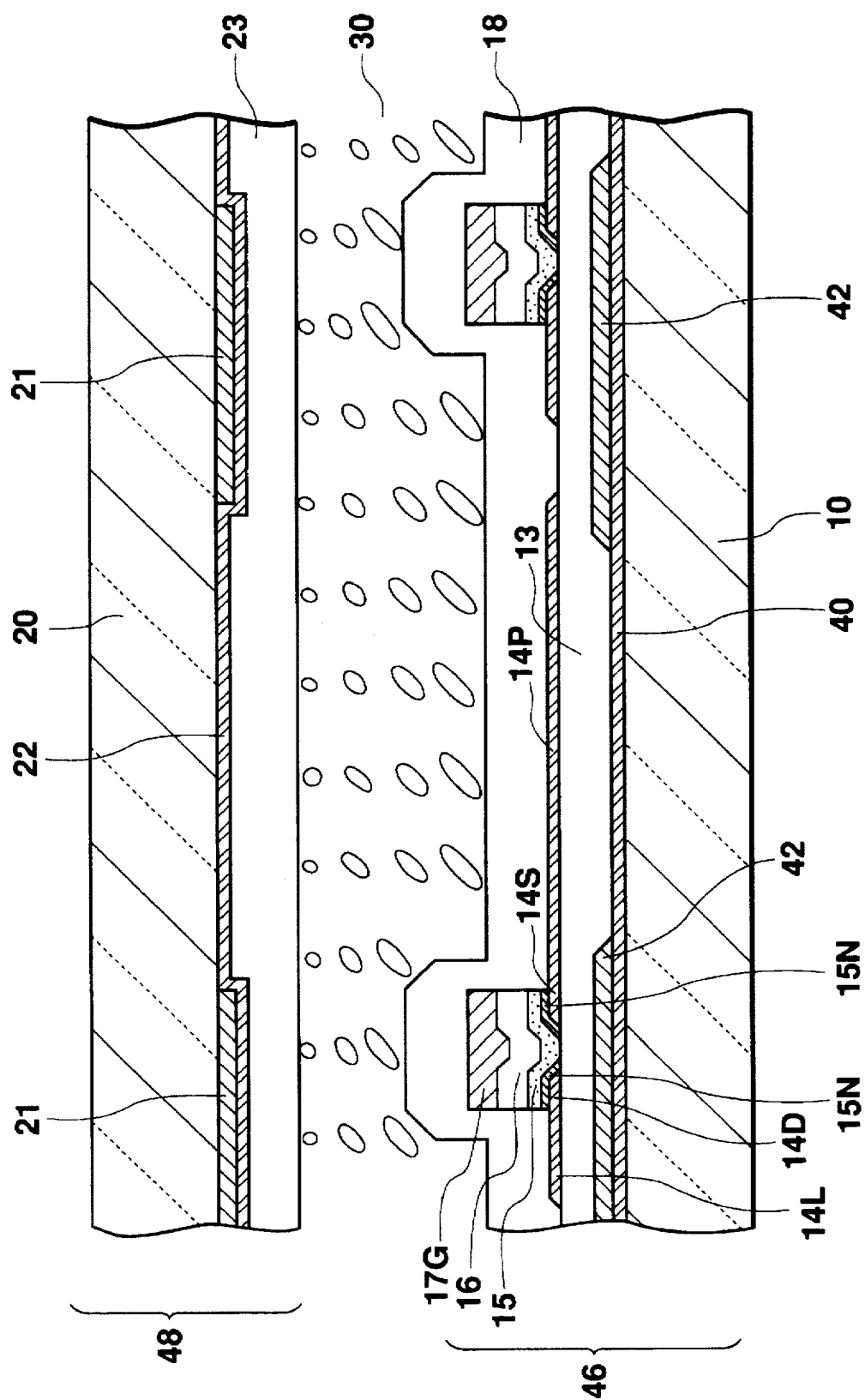
FIG. 4 is a cross section of the liquid crystal display, taken along line 3X–3X' shown in FIG. 3.
Figure 9:
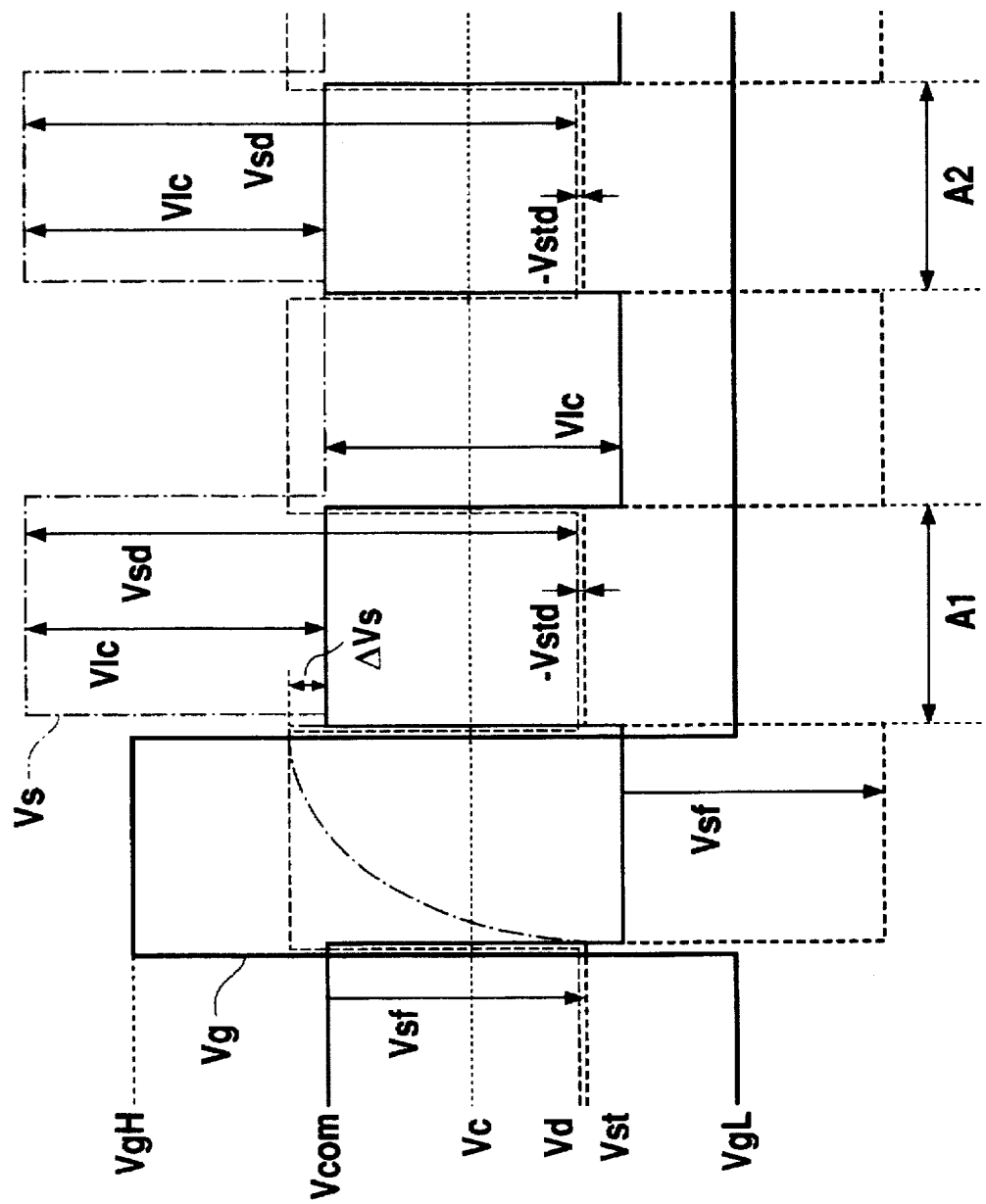
FIG. 9 shows waveforms of voltages applied to drive the liquid crystal display according to the invention.

So as to overcome the foregoing problems, the liquid crystal display having the structure as shown in FIG. 4 should be preferably actuated using the voltages having waveforms as shown in FIG. 9. As in FIG. 7, the identical voltages are denoted by identical characters. The driving method of FIG. 9 is characterized in that the storage capacitor electrode voltage Vst is level-shifted from the common electrode voltage Vcom.

Figure 10:
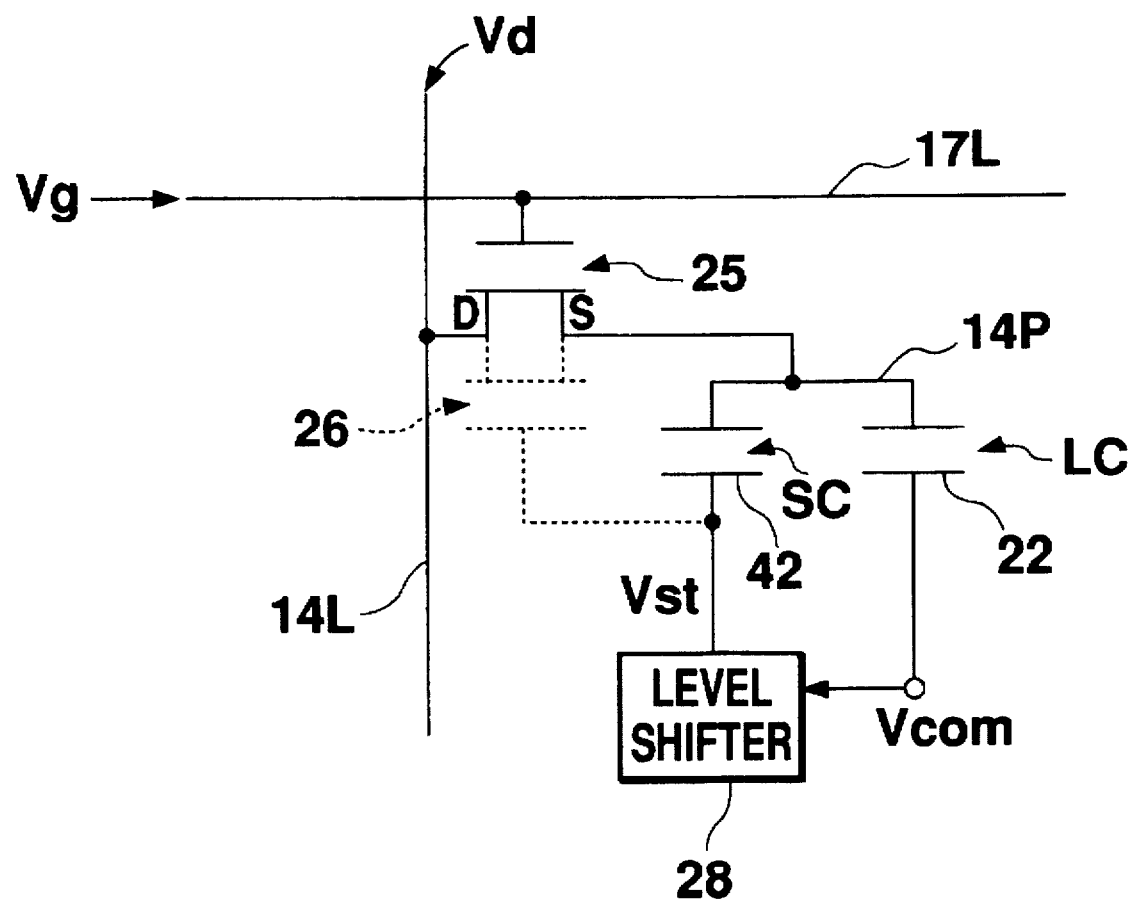
FIG. 10 shows an equivalent circuit for driving the liquid crystal display by applying the voltages shown in FIG. 9.

A voltage Vst, obtained by shifting down the common electrode voltage Vcom by Vsf, is applied to the storage capacitor electrode 40. While the drain voltage Vd is negative and the common electrode voltage Vcom is positive, the positive level of the source voltage Vs is further heightened in accordance with the positive level of the common electrode voltage Vcom. In the periods A1, A2, . . . while the voltage Vsd between the source and drain becomes large, the potential difference Vstd of the storage capacitor electrode voltage Vst to drain electrode voltage Vd is designed so as not to exceed the threshold of the parasitic TFT. A circuit shown in FIG. 10 is used for this operating method. A part of the common electrode signal is input to a well-known level shift circuit 28.

Referring to FIG. 9, the storage capacitor electrode voltage Vst is set to be lower by a specified level Vsf than the common electrode voltage Vcom. The maximum potential difference between the storage capacitor electrode voltage Vst and the drain voltage Vd and a maximum potential difference between Vst and source voltage Vs are designed to be smaller than the threshold of the parasitic TFT 26 shown in FIG. 10, thereby substantially removing the parasitic TFT.

In an even-numbered field shown in FIG. 9, Vstd between the storage capacitor electrode and the drain electrode should be kept as small as possible so as not to operate the parasitic TFT 26 (shown in FIG. 10). In an odd-numbered field (not shown), Vsts of the storage capacitor electrode voltage Vst to source voltage Vs should be maintained as small as possible for the same reason as that described above.

When, for instance, the level of the center level of the storage capacitor electrode voltage Vst is set to be equal to the low level VdL of the gate voltage Vg as shown in FIG. 9, a potential difference Vstd of the storage capacitor electrode voltage Vst to both the source voltage Vs and the drain voltage Vd is to be kept smaller than the operating threshold of the parasitic TFT 26. This prevents the OFF resistance of the TFT 25 from being reduced by the electrical field of the storage capacitor electrode 40. Thus, it is possible to prevent the source voltage Vs from shifting with the leakage current, and the liquid crystal holding voltage Vlc from being reduced, and improve the voltage holding ratio.

Figure 11:
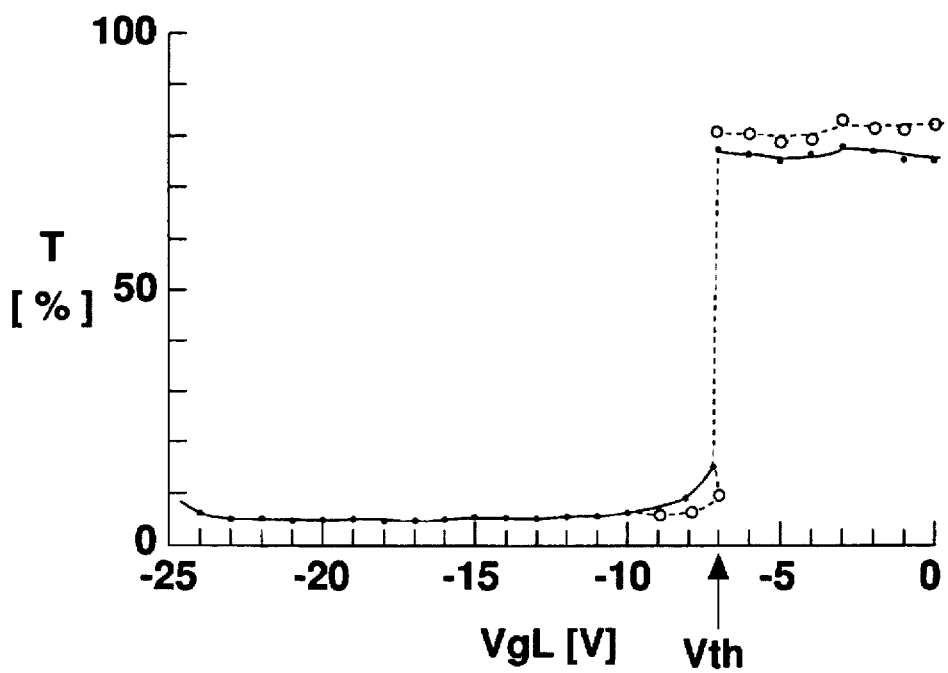
FIG. 11 is a graph showing the relationship between the low level of a gate voltage and light transmittance when the liquid crystal display is driven according to the method of the invention.
Figure 12:
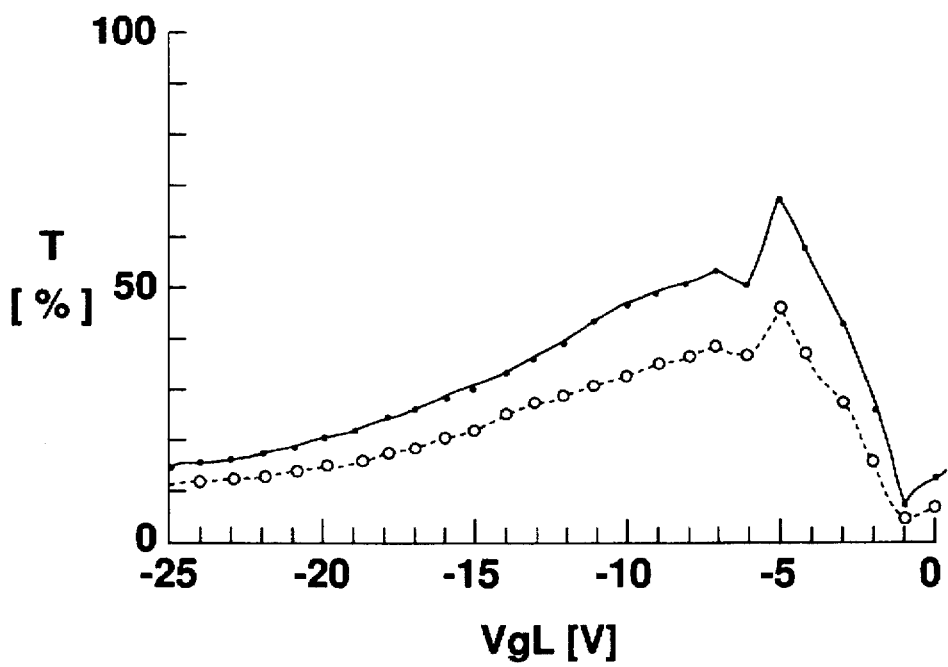
FIG. 12 is a graph showing the relationship between the low level of a gate voltage and light transmittance when the conventional liquid crystal display is driven.

Relationship between the gate voltage VgL and light transmittance T of the foregoing liquid crystal display will be described on the basis of experiments conducted by the inventor(s). FIG. 11 shows the average of the light transmittance T. In this case, the gate voltage VgL was set to certain values, and the liquid crystal display was driven by applying voltages as shown in FIG. 9. FIG. 12 shows the average light transmittance T when the liquid crystal display was driven by applying voltages as shown in FIG. 7 related to the prior art. In the experiments, the liquid crystal display was driven by the line at a time reversing drive method. The storage capacitor electrode voltage Vst was made to have the waveforms as shown in FIGS. 9 and 7. The drain voltage Vd had a maximum amplitude 10[V] within its actual driving range. In this state, the gate voltage VgL was varied from −25[V] to 0[V] with an amplitude of 35[V] maintained between the H and L levels VgH and VgL of the gate voltage Vg. Under this condition, the average of the light transmittance T was derived of a normally white mode liquid crystal display. The experiments were mainly conducted so as to assess OFF characteristics of TFTs on the basis of the light transmittance T.

Referring to FIGS. 11 and 12, a line graph plotted by white points (○) denotes experiment results obtained at the initial stage of the operation of the liquid crystal display, while a line graph plotted by black points (●) denotes experiment results obtained after the liquid crystal display was operated half an hour under the condition of 4 million luxes and at 60° C. as a reliability test.

Referring to FIG. 11, when the gate voltage VgL is −7V or lower, the TFTs remain inactive and maintain a sufficiently high OFF resistance. Further, a parasitic transistor caused by the storage capacitor electrode is not actuated either. Thus, the OFF resistance of the TFTs is maintained high, and no leakage current is generated during the OFF period of the TFTs. Therefore, the source voltage Vs, which is applied to the source electrode of the TFTs during the H level VgH of the gate voltage, is held during the OFF period of the TFTs. The light transmittance T of the liquid crystal display is kept stable. This enables the liquid crystal display to have a sufficiently low light transmittance, and to indicate a black color.

When the gate voltage VgL is gradually raised to −7[V] as shown in FIG. 11, OFF characteristics of the TFTs become unstable, which abruptly lowers the OFF resistance. Therefore, the source voltage Vs, applied to the source electrode during the ON period of the TFTs, cannot be maintained during the OFF period of the TFTs. As a result, the source voltage Vs is shifted, so no voltage is applied to the liquid crystal capacitor. This causes the light transmittance of the liquid crystal display to be raised, and a white color to be displayed. Specifically, when the gate voltage VgL is above the threshold voltage Vth (−7[V] in this case), the light transmittance T experiences a large increase in sharpness as can be seen from FIG. 11. Further, it is evident that these favorable characteristics are kept after the above reliability tests' initial stage.

Referring to FIG. 12, even when the gate voltage VgL is below −7V, i.e., the threshold where the OFF resistance changes, the parasitic transistor is actuated by the storage capacitor electrode voltage Vst during the periods A1, A2, . . . shown in FIG. 7. An OFF leakage current is generated in the TFTs. Thus, the source voltage Vs, which is applied to the source electrode during the ON period of TFTs, becomes closer to the drain voltage Vd during each period A1, A2, . . . and cannot remain stable. This raises the light transmittance T.

With the driving method shown in FIG. 7, the OFF state of the TFTs is not stably maintained regardless of the level of the gate voltage VgL, a leakage current is inevitably generated. Therefore, the voltage applied to the source electrode is not maintained during the OFF period of the TFTs, so no voltage is applied to the liquid crystal capacitor. The liquid crystal display has an intermediate level of light transmittance T, and tends to provide a low quality picture. As can be seen from FIG. 12, when the driving method shown in FIG. 7 is adopted, the gate voltage VgL should be set below −25[V] and the gate voltage VgH should be kept above a certain level so as to obtain a maximum contrast rate. However, the gate voltage VgH should be kept above a certain level, while such a low gate voltage VgL requires that the gate voltage Vg should have a large amplitude. Therefore, there is a problem in that the liquid crystal display consumes more power. Before or after a reliability test (shown by the white and black points ○, ●), the light transmittance T varies extensively. In other words, the leakage current of the TFTs is extensively increased during light irradiation or under a high temperature (shown by the black points ●) compared with the leakage current during the initial stage of the operation (shown by the white points ○). As a result, the source electrode drastically reduces its voltage holding ratio. Therefore, even when the gate voltage VgL is −7[V] or less, the black color cannot be displayed reliably.

When the storage capacitor electrode voltage Vst is level-shifted by Vsf with respect to the common electrode voltage Vcom, it is possible to nullify the field effect of the storage capacitor electrode toward the a-Si layer, and reduce the leakage current during the OFF period of the TFTs. This improves the voltage holding ratio in the source electrode. As shown in FIG. 11, the light transmittance T of the liquid crystal display (of the normally white mode) can be reliably maintained at a low level so long as the gate voltage VgL remains smaller than the threshold voltage Vth. Thus, the liquid crystal display can operate with an increased reliability. Further, when the driving method of FIG. 9 is adopted, it is possible to realize a liquid crystal display which has excellent voltage-light transmittance characteristics in which the light transmittance T quickly changes when the gate voltage VgL is equal to the threshold voltage Vth. Therefore, the gate voltage VgL can be set slightly lower than the threshold voltage Vth shown in FIG. 11, i.e., at a relatively high level. This enables the amplitude of the gate voltage Vg to be small compared with the driving method shown in FIG. 7, and allows reduction in the power consumption of the liquid crystal display.

Even if the pixel electrode 14P and the storage capacitor electrode 40 are shorted by a pin hole on the interlevel insulation layer 13 (shown in FIG. 4), the pictures can be protected against being adversely affected. This means yield increase of acceptable products. In other words, if these two electrodes are shorted, the storage capacitor electrode voltage Vst which is lower than the common electrode voltage Vcom by Vsf is applied to the pixel electrode 14P. This results in the voltage Vsf being applied to the liquid crystal capacitor LC of the pixel. Therefore, if in the normally white mode, the pixel in question becomes black, which makes the defective dot less distinguishable on the display.

Embodiment 2:

A second embodiment is an improvement of the first embodiment. In the liquid crystal display shown in FIG. 4, Cr which is a material of the light-shielding layer 42 has a high reflectance. When light is incident into the liquid crystal display from an external light source, some ambient light around the periphery of each pixel electrode 14P is reflected by the light-shielding layer 42. The reflected light disturbs images, reduces contrast of the images, and results in low quality pictures.

When pictures are observed from the side of the TFT substrate 46, light arriving from the light source on the side of the opposing substrate 48 is shielded or reflected by the light-shielding layer 21 (of the opposing electrode 48) and the surface of the opposing substrate 48 facing the light-shielding layer 42 (of the TFT substrate 46). However, when ambient light is incident via the TFT substrate 46, it is reflected by the surface of the TFT array substrate 46 facing the light-shielding layer 21, and makes the picture less visible.

In the case of a normally white mode type liquid crystal display (i.e., the liquid crystal display which passes light while no voltage is applied to the liquid crystal capacitor), ambient light incident via the opposing substrate 48 would pass through the liquid crystal layer 30 in the non-pixel area. Such ambient light is reflected by the gate electrode 17G made of Al or the gate line 17L (shown in FIG. 3), or passes through the pixel electrode 14P or drain line 14L made of ITO, and is reflected by the light-shielding layer 42 present under the pixel electrode 14P or drain line 14L. The reflected light is radiated via the opposing substrate 48, and makes the picture less visible.

If the liquid crystal display is used for a projection TV or the like together with a strong light source, light will be reflected between the substrates, and scattered in the liquid crystal display panel. In such a case, if scattered light is incident via the a-Si layer 15, a photoelectric leakage current will be generated in the TFT, the voltage holding characteristics of the liquid crystal capacitor of each pixel will be reduced, and the contrast ratio of the pictures will be lowered.

To reduce the reflectance of the light-shielding layer 42, the light-shielding layer 42 may be made of Cr and CrOx, the latter of which has a low reflectance. Specifically, Cr having the high light-shielding performance is formed as a layer of approximately 1000 Å thick. On the Cr layer is formed a CrOx layer, which is approximately 500 Å thick and has an anti-reflection function. The CrOx layer is present on the TFT substrate 46 facing toward the viewer. This prevents visibility of the pictures from being lowered due to light reflected by the Cr layer. In the prior art, when sputtering Cr, such a Cr/CrOx light-shielding layer 42 can be formed by applying oxygen into a chamber for a predetermined period of time. While oxygen is being applied, a CrOx layer is formed. However, this method requires a relatively large film-forming apparatus, i.e., a unit for applying Ar into the chamber, a unit for introducing oxygen, and a unit for controlling the oxygen introducing unit. This method is time-consuming and expensive.

The light-shielding layer 42 is patterned by etching Cr/CrOx in a mixture of nitrate cerium ammonium, and nitrate or perchloric acid. However, since Cr and CrOx have different etching rates, CrOx has a low etching rate. Thus, the CrOx tends to suffer from faulty etching. Any remaining CrOx will appear as black dots on the display area, which reduces the quality of the display image. To overcome this problem, the etching time should be sufficiently long. An extended etching period means reduced throughput.

In the second embodiment, the light-shielding layer having a low reflectance is formed as follows. The opposing substrate of this embodiment is configured similarly to that shown in FIG. 4, while the TFT substrate has a profile similar to that shown in FIG. 3. This TFT substrate has a cross-section as shown in FIG. 13, which is a cross-section of one pixel area, similar to that taken along line 3X–3X' in FIG. 3.

Figure 13:
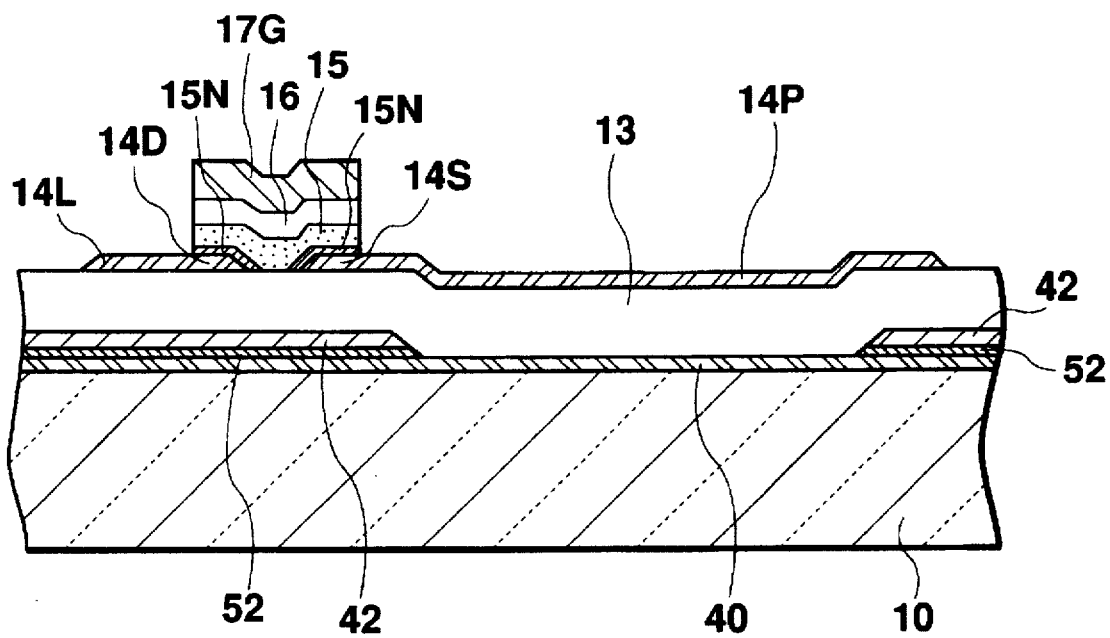
FIG. 13 is a cross section of a TFT substrate in a liquid crystal display according to a second embodiment.

Referring to FIG. 13, the storage capacitor electrode 40 extends all over the transparent substrate 10, and has the light-shielding layer 42, made of Cr, at its light-shielding area. An anti-reflection layer 52 made of CrOx is interposed in the boundary between the light-shielding layer 42 and the storage capacitor electrode 40. The CrOx has a low reflectance.

The storage capacitor electrode 40 is formed by the ITO sputtering process using a metal mask, as done in the first embodiment. The sputtering process is performed in a chamber having an indium target and a tin target. A metal mask is secured to the peripheral area of the substrate 10 under a pressure 0.75 pa, and at a temperature of 285° C. An Ar gas is introduced at a flow rate of 200 sccm, and $O_2$ gas is also applied thereto at a flow rate of 2.0 sccm. Thus, the ITO layer having a 1400 Å thickness is formed on the substrate 10.

Cr is sputtered and photoetched so as to obtain the light-shielding layer 42. Sputtering is performed in a chamber containing a Cr target under a pressure of 0.40 pa and at a temperature of 200° C. In this state, a DC power of 1.30 kW is discharged so as to form an electrical field, and an Ar gas is introduced at a flow rate of 80 sccm. Thus, a Cr layer is formed approximately 2000 Å thick on the storage capacitor electrode 40.

The CrOx layer 52, interposed between the light-shielding layer 42 and the storage capacitor electrode 40, is formed by baking an ITO layer and Cr layer. Specifically, after making the ITO layer and patterning the Cr layer, the substrate 10 is left at a temperature of 400° C. for half an hour. Cr is oxidized by oxygen in ITO, thereby forming the thin CrOx film at a boundary of the ITO and Cr layers.

After the baking process, the interlevel insulation layer 13 made of $SiO_2$ is formed by the CVD process so as to entirely cover the light-shielding layer 42 and the storage capacitor electrode 40. Thereafter, the following layers are simultaneously formed using the same ITO layer, similarly to the first embodiment: the drain line 14L, drain electrode 14D, pixel electrode 14P, source electrode 14S, and an input terminal electrode 14C similar to that shown in FIG. 6. Further, the $N^+$-a-Si layer 15N, a-Si layer 15, gate insulating layer 16, and gate electrode 17G integral with the gate line 17L are formed in the same pattern between rows of the pixel electrodes and at areas facing the source and drain electrodes 14S and 14D, respectively. Each TFT is constituted at an area facing the source and drain electrodes 14S and 14D, respectively.

Figure 14:
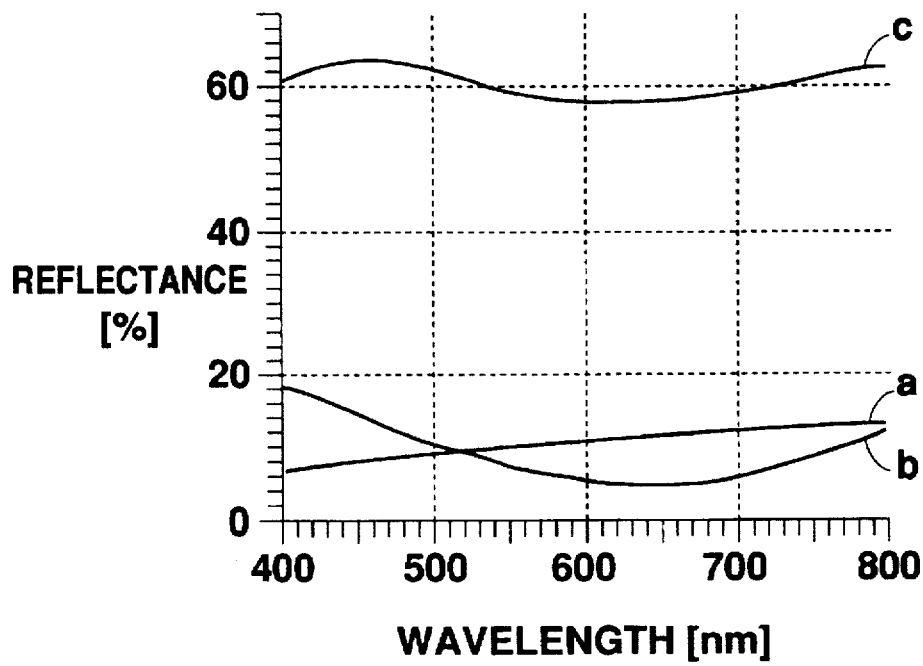
FIG. 14 is a graph showing reflectance of a CrOx layer and a Cr layer.

FIG. 14 is a graph showing the reflectance (a) of the CrOx layer, which is formed by the baking process, at the boundary of the Cr and ITO layers of the second embodiment, the reflectance (b) of the CrOx by depositing the Cr layer while introducing oxygen as in the prior art, and reflectance (c) of the Cr layer. In FIG. 14, wavelength is 400 nm to 800 nm. As can be seen from FIG. 14, the single Cr layer has a reflectance (c) of approximately 60%, which adversely affects pictures to be displayed. The conventional CrOx layer has a reflectance (b) which is suppressed to 20% or lower in the range of visibility, and assures good visibility of pictures. When comparing (a) and (b), the CrOx layer of the present invention has more stable characteristics than those of the conventional CrOx layer. This means that the film-forming method of the present invention can produce films which have a low reflectance and little wavelength dependency compared with those produced by the conventional method in which Cr is sputtered by introducing oxygen.

In the second embodiment, the anti-reflection layer 52 is present under the light-shielding layer 42 so as to prevent reflection of light arriving from the underside of the TFT substrate. Therefore, the picture is visible without being affected by light reflected by the light-shielding layer 42 on the side of the substrate 10. The liquid crystal display having the TFT array substrate facing toward the observer can provide good visible pictures.

This liquid crystal display can be obtained by adding the following to the liquid crystal display of the first embodiment: the storage capacitor electrode 40 made of ITO; and the CrOx layer formed on the light-shielding layer 42 by the baking process. Therefore, no special sputtering apparatus will be required to form the CrOx and Cr layer. Further, it is not necessary to lengthen the period to etch the CrOx layer. Thus, the liquid crystal display can be manufactured at a reduced cost without lowering throughput.

Embodiment 3

Figure 15:
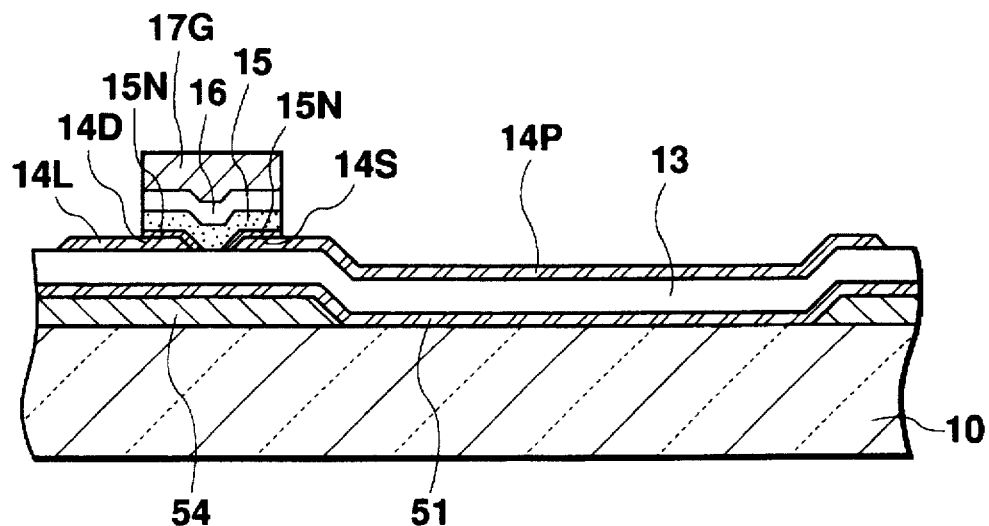
FIG. 15 is a cross section of a modification of the TFT substrate of the first embodiment.

A third embodiment is a modification of the second embodiment. In the TFT substrate of the first embodiment, a light-shielding layer 54 made of Cr may be formed on a light-shielding area (shown in FIG. 3) of the transparent substrate 10. Then, a storage capacitor electrode 51 made of ITO is formed all over the light-shielding layer 54 and the substrate 10, as shown in FIG. 15.

Figure 16:
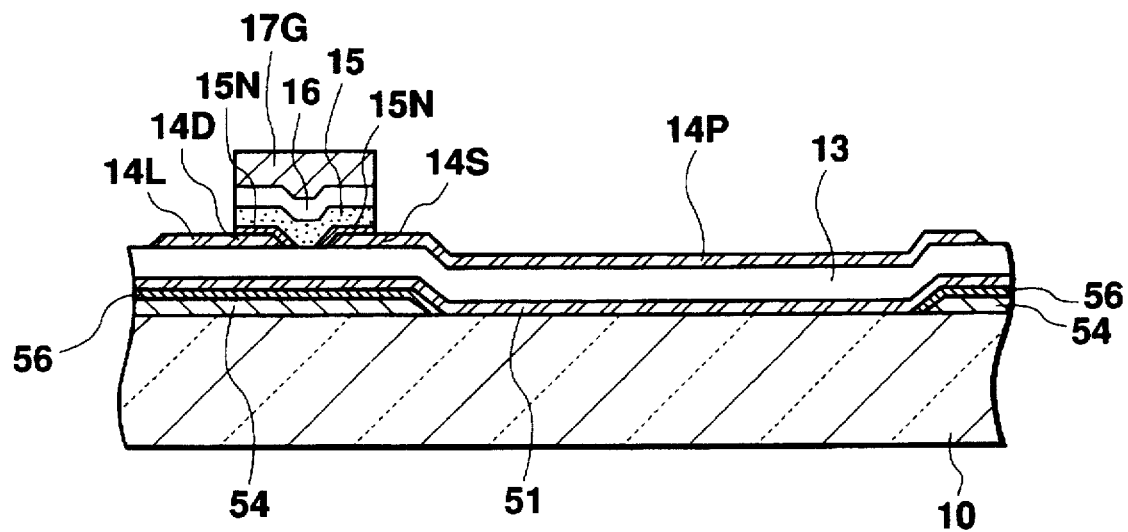
FIG. 16 is a cross section of a TFT substrate of a liquid crystal display according to a third embodiment.

To prevent reduced visibility of pictures due to the reflectance of the light-shielding layer 54, a CrOx layer 56 as an anti-reflection layer may be formed at a boundary between the light-shielding layer 54 and the storage capacitor electrode 51 (shown in FIG. 16). Further, it is preferable to form the CrOx layer 56 by the baking process as described with respect to the second embodiment.

Specifically, Cr is sputtered and photoetched on the substrate 10 so as to form the light-shielding layer 54. The sputtering is performed in a chamber having a Cr target, and under a pressure of 0.40 Pa and at 200° C., by discharging 1.30 kW of DC power so as to form an electrical field. In this state, an Ar gas is applied at a flow rate of 80 sccm The light-shielding layer 54 is formed approximately 2000 Å thick, and is then photoetched as shown by the shaded portion in FIG. 3.

Next, the storage capacitor electrode 51 is formed on the light-shielding layer 54 and the substrate 10 by sputtering ITO. The sputtering conditions are the same as those for the second embodiment. Thus, the ITO storage capacitor electrode 51 is formed approximately 1400 Å thick.

After forming the storage capacitor electrode 51, the substrate 10 is baked for half an hour at 400° C., thereby obtaining the CrOx layer 56 at the boundary between the Cr and ITO layers.

The CrOx layer 56 has a low reflectance similarly to the CrOx layer 52 of the second embodiment, as shown by the curve (a) in FIG. 14. The CrOx layer 56 of this embodiment has a low reflectance and little wavelength dependency compared with the CrOx layer which is formed by sputtering Cr while introducing oxygen.

Since the CrOx anti-reflection layer 56 is present over the light-shielding layer 54 in the third embodiment, it is possible to prevent reflection of light which is incident from above the TFT array substrate, i.e., via the opposing substrate, not shown. Therefore, in the normally white mode, ambient light which is incident onto the shielded portion of the TFT substrate via the opposing electrode can be prevented from passing the drain line 14L made of ITO, being reflected by the light-shielding layer 54 and returning through the same route. Thus, displayed images will not be disturbed by the reflected light. Since the opposing substrate is established so as to face the viewer, the third embodiment is effective in providing a direct viewing type liquid crystal display which can offer high quality pictures.

Further, light is not reflected between the two substrates and is not scattered within the display panel. Thus, it is possible to overcome the problems that scattered light reaches the a-Si layer 15 as the channel area of the TFT, that the TFT suffers from a leakage current, and that the contrast of images is lowered due to a reduced voltage holding function of the liquid crystal capacitor in each pixel. This liquid crystal display is applicable to a projection TV using strong light.

The liquid crystal display of this embodiment is manufactured only by adding the baking process after the Cr patterning process and the ITO layer forming process. In other words, no special unit is necessary to perform the sputtering so as to form the CrOx layer, which means a reduced manufacturing cost.

What is claimed is:

1. A liquid crystal display comprising a first substrate and a second substrate facing each other with a liquid crystal layer interposed therebetween, wherein:

the first substrate includes thereon: a plurality of pixel electrodes arranged in a matrix array; drain lines formed between columns of the pixel electrodes; gate lines formed between rows of the pixel electrodes; thin film transistors, each of said thin film transistors having a source electrode connected to a respective one of the pixel electrodes, a drain electrode connected to a respective one of said drain lines, and a gate electrode connected to a respective one of said gate lines; a first light-shielding layer having a first aperture shielding light between the pixel electrodes; a storage capacitor electrode opposed to the pixel electrodes with an interlevel insulation layer interposed therebetween, said storage capacitor electrode being a transparent conductive layer disposed substantially all over the first substrate including under each of said thin film transistors; and storage capacitors holding charges, the storage capacitors formed in an area where the pixel electrodes are opposed to the storage capacitor electrode; and the second substrate includes a common electrode extending substantially all over an area where the first and second substrates face each other.

2. The liquid crystal display of claim 1, wherein the second substrate includes a second light-shielding layer at a position corresponding to the first light-shielding layer, and the second light-shielding layer has a second aperture larger than the first aperture of the first light-shielding layer.

3. The liquid crystal display of claim 1, wherein said storage capacitor electrode extends substantially all over the first substrate except at a peripheral edge portion thereof.

4. The liquid crystal display of claim 1, wherein the first light-shielding layer is formed on the storage capacitor electrode.

5. The liquid crystal display of claim 4, wherein the storage capacitor electrode is made of an oxide alloy of indium and tin, the first light-shielding layer is made of chromium, and an anti-reflection layer made of chromium oxide is formed on a boundary between the first light-shielding layer and the storage capacitor electrode by heat treatment after formation of the storage capacitor electrode and the first light-shielding layer.

6. The liquid crystal display of claim 1, wherein the first light-shielding layer is formed under the storage capacitor electrode, the storage capacitor electrode is made of an oxide alloy of indium and tin, the first light-shielding layer is made of chromium, and an anti-reflection layer made of chromium oxide is formed on a boundary between the first light-shielding layer and the storage capacitor electrode by heat treatment after formation of the storage capacitor electrode and the first light-shielding layer.

7. The liquid crystal display of claim 1, wherein an interlevel insulation layer and a semiconductor layer are formed under the gate lines, said thin film transistors each have:

said source electrode formed by a part of said respective one of said pixel electrodes, said drain electrode formed by a part of said respective one of said drain lines, a channel layer formed by a part of the semiconductor layer positioned at an area where the source electrode and the drain electrode lie adjacent to each other, a gate interlevel insulation layer formed by a part of the interlevel insulation layer extending over the channel layer, and said gate electrode formed by a part of said respective one of said gate lines positioned on the gate interlevel insulation layer, and the gate lines, the interlevel insulation layer and the semiconductor layer are identically patterned.

8. The liquid crystal display of claim 7, wherein the voltage of the storage capacitor signal applied to the storage capacitor electrode is determined such that when a respective one of said thin film transistors is not selected, a first potential difference between the drain electrode of said respective one of the thin film transistors and the storage capacitor electrode and a second potential difference between the source electrode of said respective one of the thin film transistors and the storage capacitor electrode are both smaller than a threshold voltage of the thin film transistors.

9. The liquid crystal display of claim 8, wherein a first voltage of the storage capacitor electrode signal is level-shifted from a second voltage of a common electrode signal applied to the common electrode.

10. The liquid crystal display of claim 7, wherein the storage capacitor electrode extends to a vicinity of an end of the first substrate, and is opposed to an input terminal electrode via the interlevel insulation layer, and a desired signal applied to the input terminal electrode controls a voltage of the storage capacitors.

11. A liquid crystal display comprising a first substrate and a second substrate facing each other with a liquid crystal layer interposed therebetween, wherein:

the first substrate includes thereon:
- a plurality of pixel electrodes arranged in a matrix array;
- drain lines formed between columns of the pixel electrodes;
- gate lines formed between rows of the pixel electrodes;
- thin film transistors, each of said thin film transistors having a source electrode connected to a respective one of the pixel electrodes, a drain electrode connected to a respective one of said drain lines, a semiconductor layer having first and second end regions connected to the source electrode and the drain electrode, respectively, an insulation layer formed on the semiconductor layer, and a gate electrode connected to a respective one of the gate lines and formed on the semiconductor layer with the insulation layer interposed therebetween, stacked in this order;
- a first light-shielding layer shielding light between the pixel electrodes;
- storage capacitor electrodes opposing the pixel electrodes with an interlevel insulation layer interposed therebetween, said storage capacitor electrodes being a transparent conductive layer applied practically all over the first substrate; and
- storage capacitors holding charges, the storage capacitors being formed in an area where the pixel electrodes and the storage capacitor electrodes overlap with one another; and the second substrate includes a common electrode extending substantially all over an area where the first and second substrates face each other.

12. A method for making a liquid crystal display having a first substrate and a second substrate sandwiching a liquid crystal layer, the method comprising:

forming a transparent conductive storage capacitor layer covering substantially an entire upper surface of said first substrate except for a first peripheral edge portion of said first substrate;

forming a first light-shielding layer on said transparent conductive storage capacitor layer, said first light-shielding layer patterned to have a first aperture;

forming an interlevel insulation layer on said transparent conductive storage capacitor layer and said first light-shielding layer;

forming a transparent conductive electrode layer on said interlevel insulation layer;

patterning said transparent conductive electrode layer to form a plurality of pixel electrodes, a plurality of source electrodes integral with said pixel electrodes, a plurality of drain lines between columns of said pixel electrodes, a plurality of drain electrodes integral with said drain lines, and an input terminal electrode on part of said first peripheral edge portion of said first substrate;

forming a semiconductor layer on said patterned transparent conductive electrode layer;

forming a gate insulating layer on said semiconductor layer;

forming a gate conductive layer on said gate insulating layer; and patterning said semiconductor layer, said gate insulating layer and said gate conductive layer to form a plurality of gate lines between rows of said pixel electrodes and a plurality of gate electrodes integral with said gate lines.

13. The method of claim 12, wherein said semiconductor layer includes amorphous silicon, said transparent conductive electrode layer includes phosphorus, and said phosphorus diffuses into said semiconductor layer forming an n-conductivity type amorphous silicon layer at a boundary between said transparent conductive electrode layer and said semiconductor layer.

14. The method of claim 12, wherein said transparent conductive storage capacitor layer includes an oxide alloy of indium and tin, said first light-shielding layer includes chromium, and an anti-reflection layer including chromium oxide is formed at a boundary between said transparent conductive storage capacitor layer and said first light-shielding layer by a heat treatment following said forming of said patterned first light-shielding layer.

15. The method of claim 12 including:

forming a second light-shielding layer on said second substrate, said second light-shielding layer patterned to have a second aperture opposite to said first aperture, said second aperture larger than said first aperture; and forming a transparent conductive common electrode layer on said second light-shielding layer and said second substrate, said transparent conductive common electrode layer covering said second light-shielding layer and all portions of a lower surface of said second substrate not covered by said second light-shielding layer, except for a second peripheral edge portion of said second substrate.

16. The method of claim 15 including:

forming a first orientation layer on said patterned gate conductive layer, gate insulation layer, semiconductor layer, said patterned transparent conductive electrode layer and said interlevel insulation layer; and forming a second orientation layer on said transparent conductive common electrode layer.

17. The method of claim 16 including:

bonding said first substrate to said second substrate by a sealant with said first orientation layer facing said second orientation layer; and filling a space between said first orientation layer and said second orientation layer with said liquid crystal layer.

18. A method for making a liquid crystal display having a first substrate and a second substrate sandwiching a liquid crystal layer, the method comprising:

forming a first light-shielding layer on said first substrate, said first light-shielding layer patterned to have a first aperture;

forming a transparent conductive storage capacitor layer entirely covering said first light-shielding layer and all portions of an upper surface of said first substrate not covered by said first light-shielding layer, except for a first peripheral edge portion of said first substrate;

forming an interlevel insulation layer on said transparent conductive storage capacitor layer;

forming a transparent conductive electrode layer on said interlevel insulation layer;

patterning said transparent conductive electrode layer to form a plurality of pixel electrodes, a plurality of source electrodes integral with said pixel electrodes, a plurality of drain lines between columns of said pixel electrodes, a plurality of drain electrodes integral with said drain lines, and an input terminal electrode on part of said first peripheral edge portion of said first substrate;

forming a semiconductor layer on said patterned transparent conductive electrode layer;

forming a gate insulating layer on said semiconductor layer;

forming a gate conductive layer on said gate insulating layer; and patterning said semiconductor layer, said gate insulating layer and said gate conductive layer to form a plurality of gate lines between rows of said pixel electrodes and a plurality of gate electrodes integral with said gate lines.

19. The method of claim 18, wherein said semiconductor layer includes amorphous silicon, said transparent conductive electrode layer includes phosphorus, and said phosphorus diffuses into said semiconductor layer forming an n-conductivity type amorphous silicon layer at a boundary between said transparent conductive electrode layer and said semiconductor layer.

20. The method of claim 18, wherein said transparent conductive storage capacitor layer includes an oxide alloy of indium and tin, said first light-shielding layer includes chromium, and an anti-reflection layer including chromium oxide is formed at a boundary between said transparent conductive storage capacitor layer and said first light-shielding layer by a heat treatment following said forming of said transparent conductive storage capacitor layer.

21. The method of claim 18 including:

forming a second light-shielding layer on said second substrate, said second light-shielding layer patterned to have a second aperture opposite to said first aperture, said second aperture larger than said first aperture; and forming a transparent conductive common electrode layer on said second light-shielding layer and said second substrate, said transparent conductive common electrode layer entirely covering said second light-shielding layer and all portions of a lower surface of said second substrate not covered by said second light-shielding layer, except for a second peripheral edge portion of said second substrate.

22. The method of claim 21 including:

forming a first orientation layer on said patterned gate conductive layer, gate insulation layer, semiconductor layer, said patterned transparent conductive electrode layer and said interlevel insulation layer; and forming a second orientation layer on said transparent conductive common electrode layer.

23. The method of claim 22 including:

bonding said first substrate to said second substrate by a sealant with said first orientation layer facing said second orientation layer; and filling a space between said first orientation layer and said second orientation layer with said liquid crystal layer.

24. A liquid crystal display having a first substrate and a second substrate sandwiching a liquid crystal layer, said liquid crystal display comprising:

a first light-shielding layer formed on said first substrate, said first light-shielding layer patterned to have a first aperture;

a transparent conductive storage capacitor layer formed entirely covering said first light-shielding layer and all portions of an upper surface of said first substrate not covered by said first light-shielding layer, except for a first peripheral edge portion of said first substrate;

an interlevel insulation layer formed on said transparent conductive storage capacitor layer;

a transparent conductive electrode layer formed on said interlevel insulation layer, said transparent conductive electrode layer patterned to form a plurality of pixel electrodes, a plurality of source electrodes integral with said pixel electrodes, a plurality of drain lines between columns of said pixel electrodes, a plurality of drain electrodes integral with said drain lines, and an input terminal electrode on part of said first peripheral edge portion of said first substrate;

a semiconductor layer formed on said patterned transparent conductive electrode layer;

a gate insulating layer formed on said semiconductor layer; and a gate conductive layer formed on said gate insulating layer, wherein said semiconductor layer, said gate insulating layer and said gate conductive layer are patterned to form a plurality of gate lines between rows of said pixel electrodes and a plurality of gate electrodes integral with said gate lines.

\* \* \* \* \*